Dec. 13, 1938.   A. R. THOMPSON ET AL   2,139,704
FRUIT PREPARATION MACHINE
Filed Sept. 24, 1934    14 Sheets-Sheet 1

INVENTOR.
Albert R. Thompson.
William de Back.
BY Philip A. Minnis
ATTORNEY.

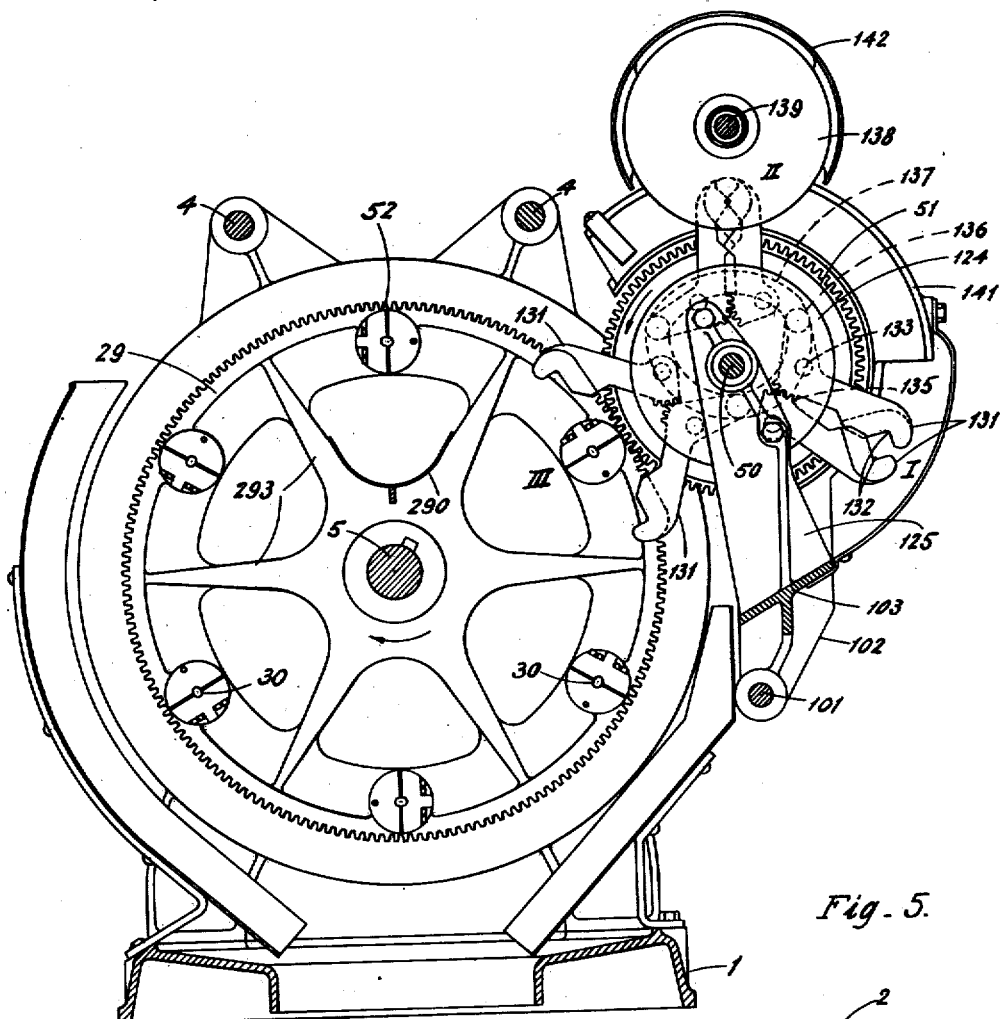
Fig. 5.
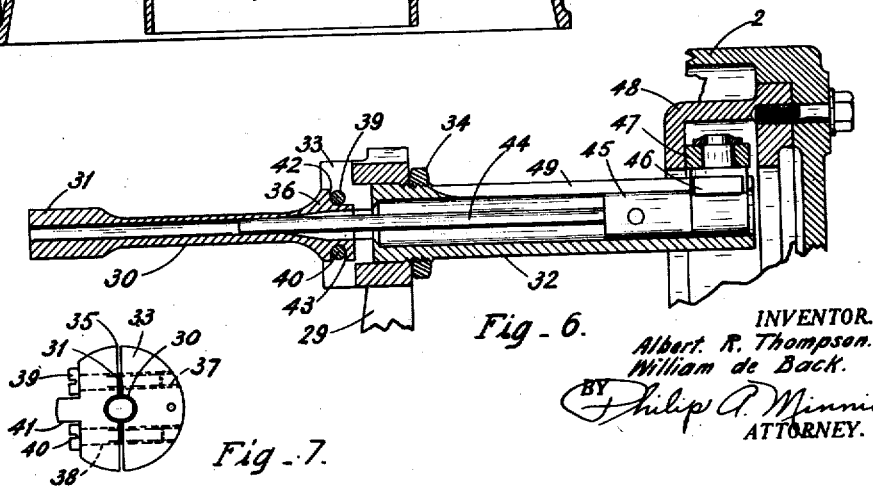
Fig. 6.
Fig. 7.

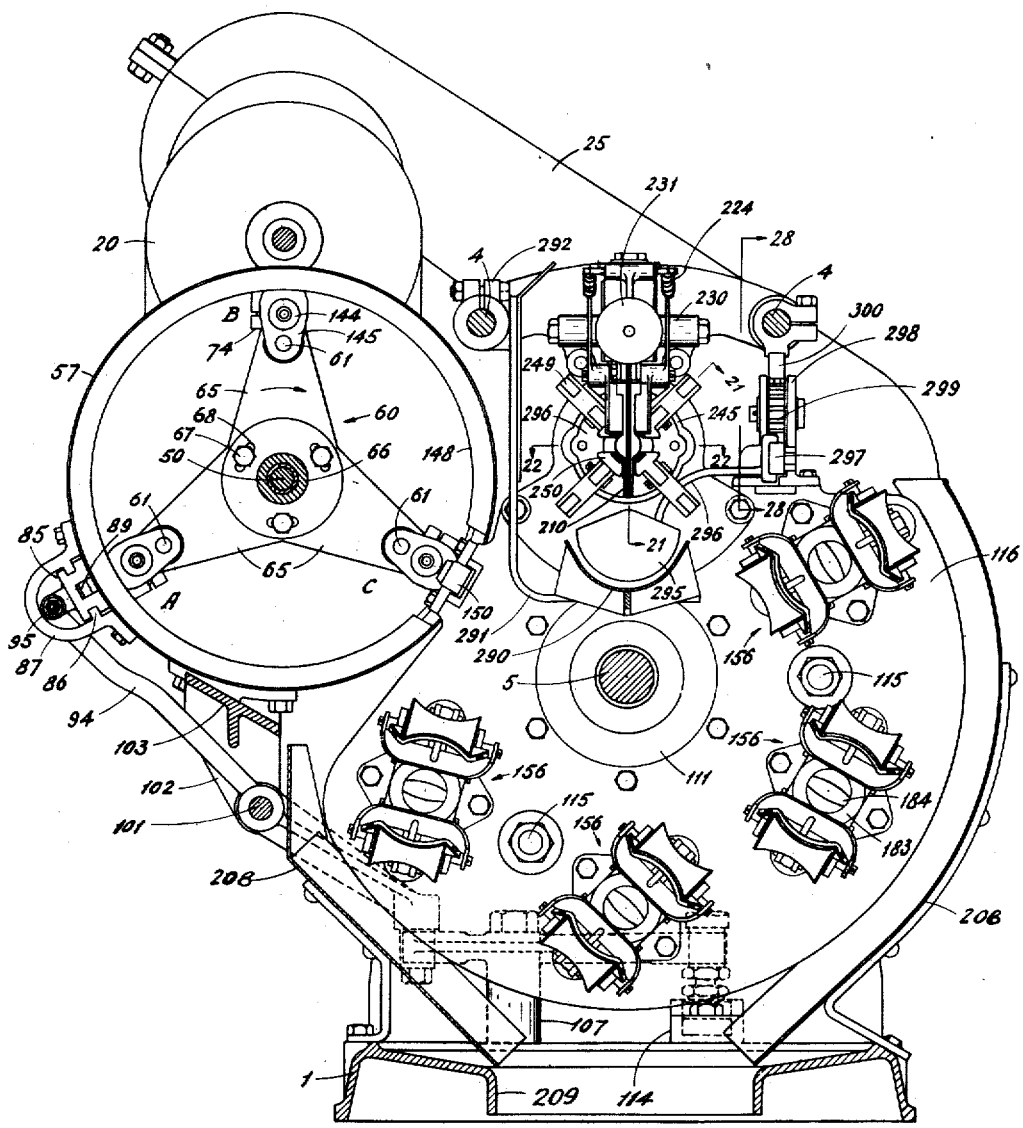
Fig_8.

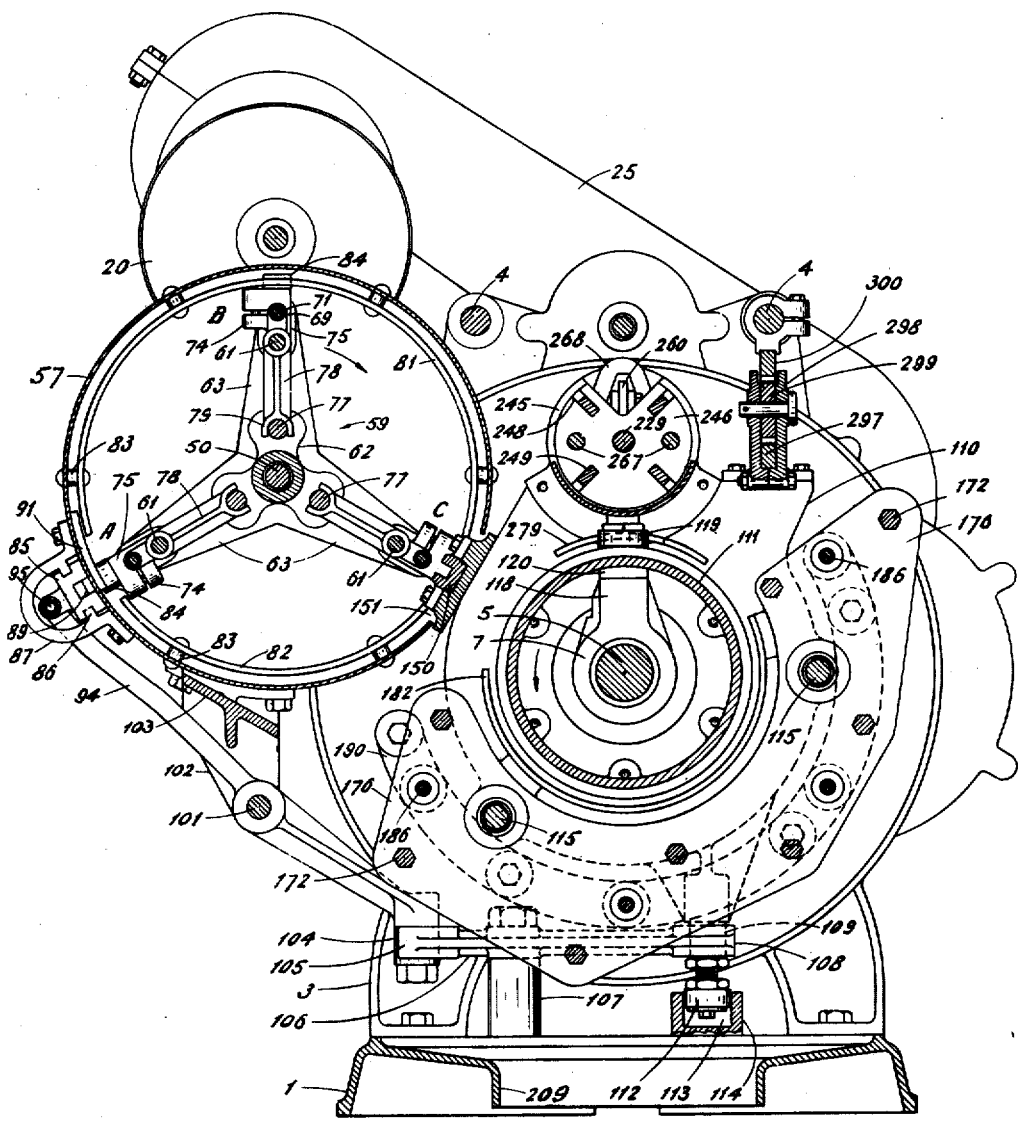
Fig_9.

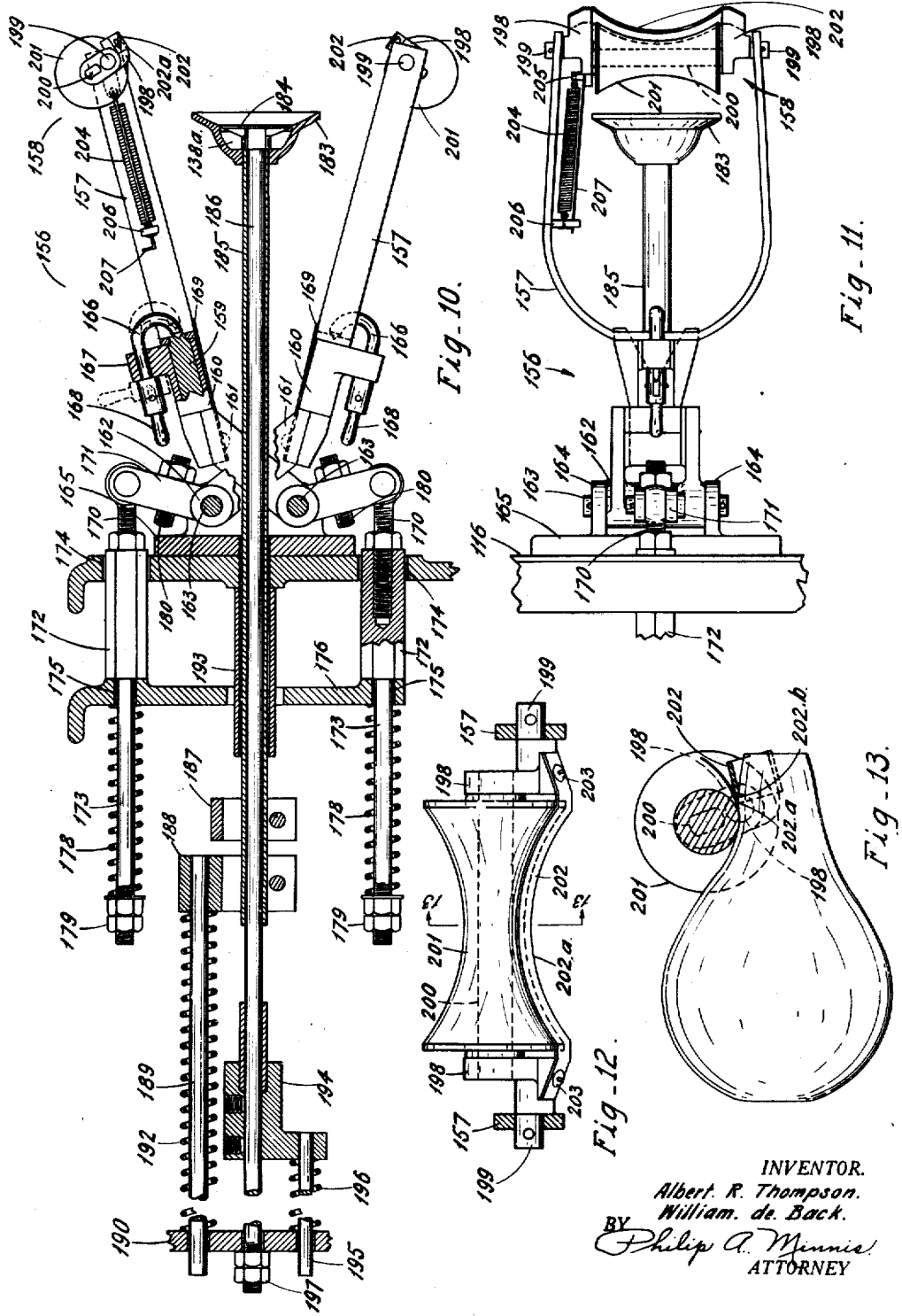

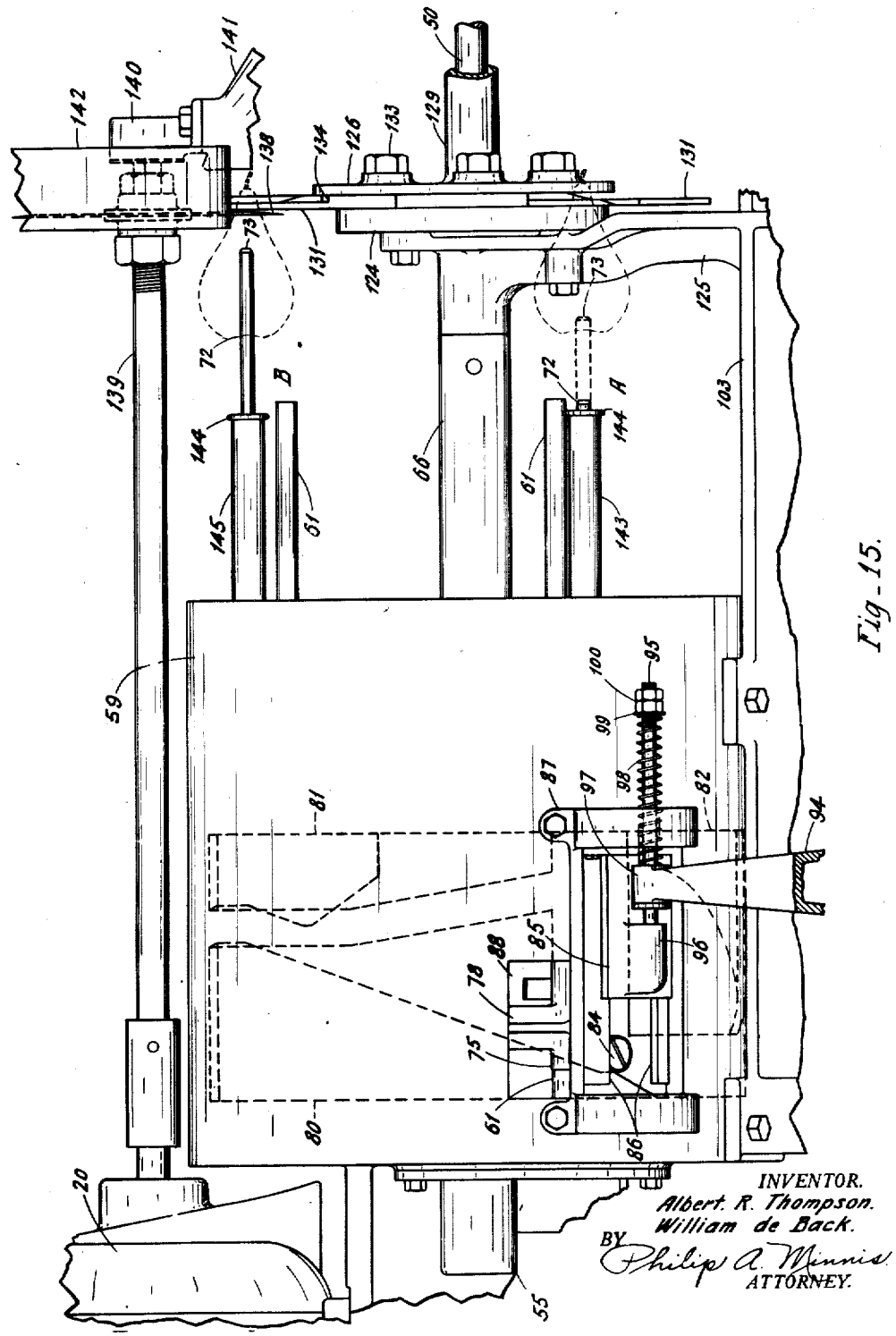

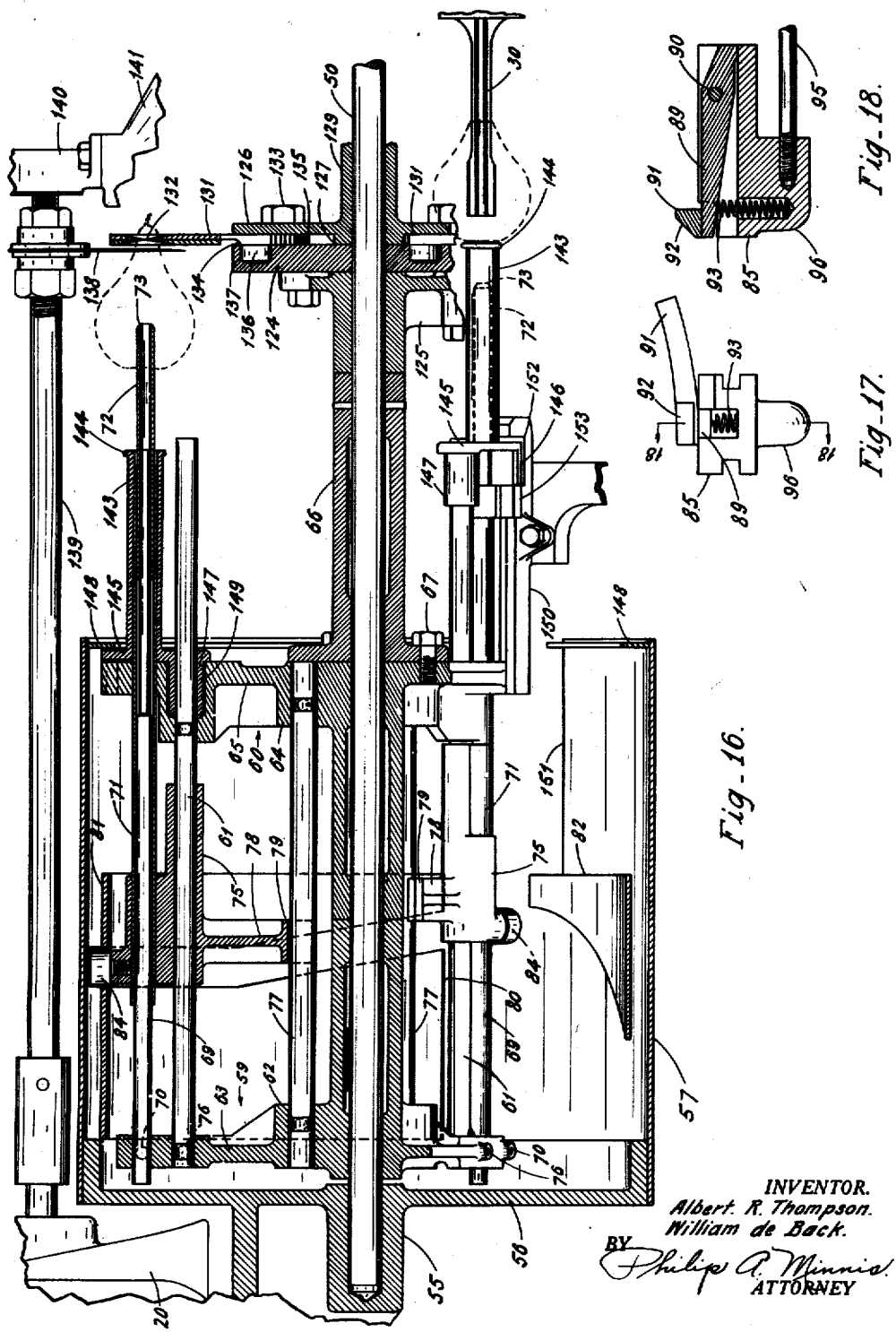

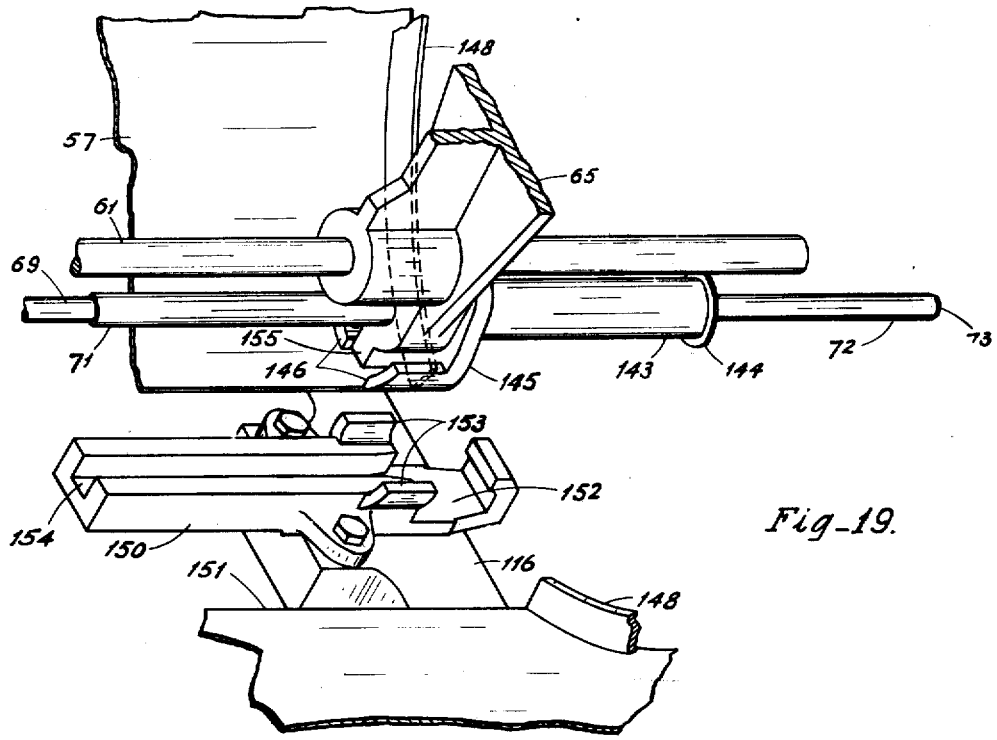
Fig_19.
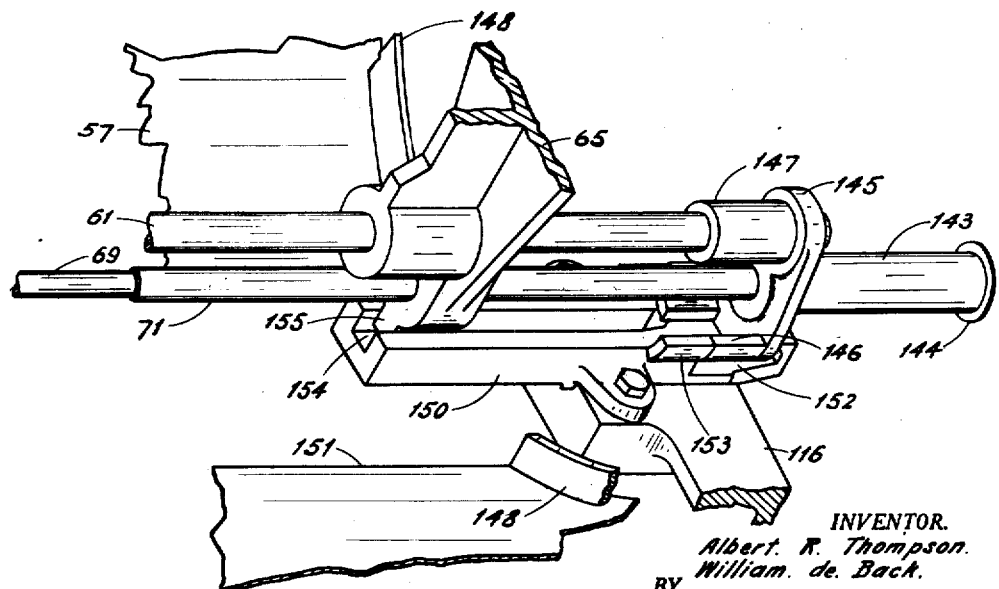
Fig. 20.

Dec. 13, 1938.  A. R. THOMPSON ET AL  2,139,704
FRUIT PREPARATION MACHINE
Filed Sept. 24, 1934  14 Sheets-Sheet 13
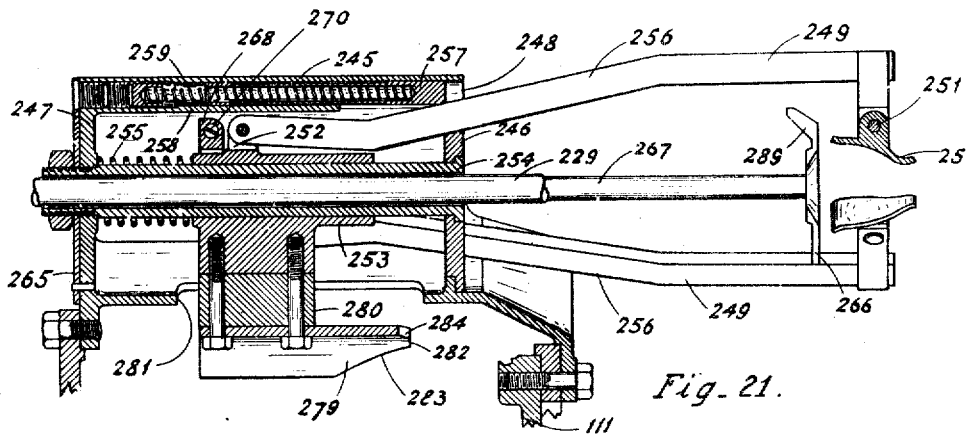
Fig. 21.
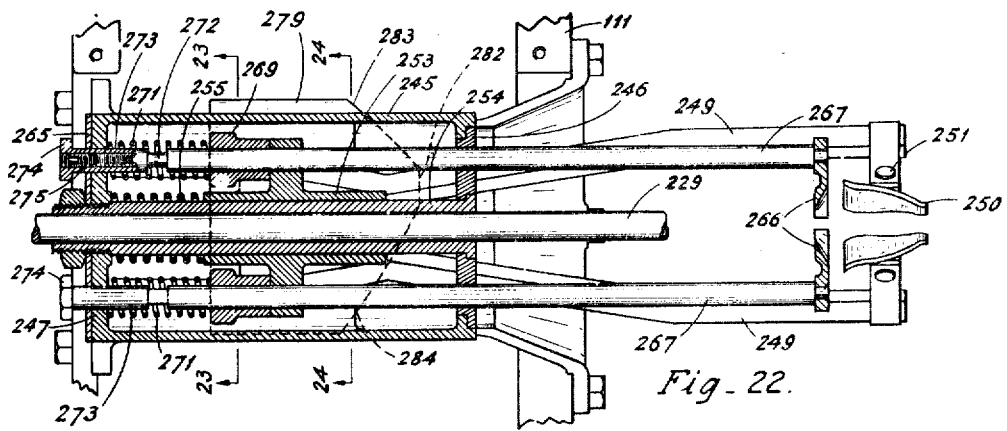
Fig. 22.
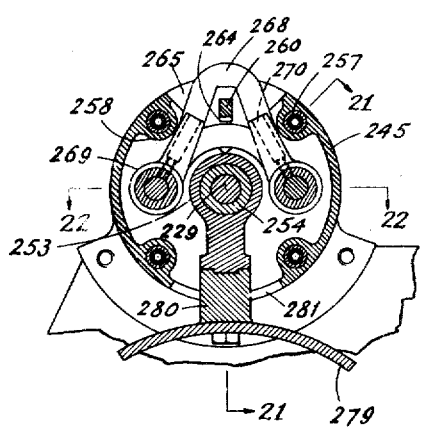
Fig. 23.
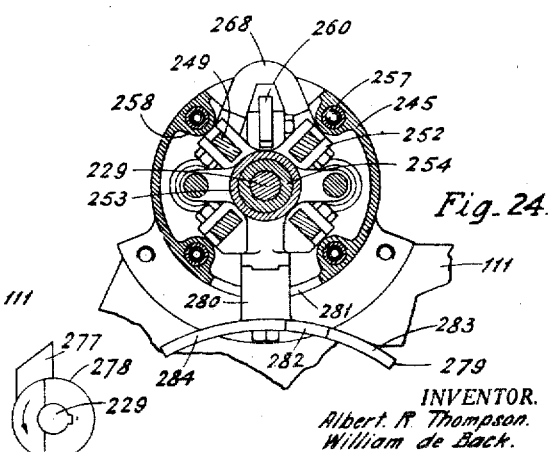
Fig. 24.
Fig. 25.
INVENTOR.
Albert R. Thompson.
William de Back.
BY Philip A. Minnis
ATTORNEY.

Dec. 13, 1938.  A. R. THOMPSON ET AL  2,139,704
FRUIT PREPARATION MACHINE
Filed Sept. 24, 1934    14 Sheets-Sheet 14

INVENTOR.
Albert R. Thompson.
William de Back.
BY Philip A. Minnis
ATTORNEY.

Patented Dec. 13, 1938

2,139,704

UNITED STATES PATENT OFFICE 2,139,704

FRUIT PREPARATION MACHINE

Albert R. Thompson and William de Back, San Jose, Calif., assignors to Food Machinery Corporation, San Jose, Calif., a corporation of Delaware Application September 24, 1934, Serial No. 745,252

80 Claims. (Cl. 146—23)

This invention relates to certain new and useful features and improvements in fruit preparation machinery such as disclosed for example in our co-pending application serial No. 533,048, filed April 27, 1931, whereby the several operations required for preparing fruit, such as pears, for canning or drying may be performed by automatically actuated mechanical means.

A general object is to provide a machine to which the pears may be fed continuously and which operates to stem, peel, split, core and trim the fruit, and finally eject the finished pieces for such further disposition as may be desired.

It is also an object to provide a fruit preparation machine which is fully automatic in the performance of its several operations.

Another object is to provide a machine for the preparation of fruit such as pairs for canning or drying which substantially eliminates all hand work and which produces a finished product of uniform and attractive appearance.

Still another object is to provide a fruit preparation machine which handles all sizes of fruit equally well, and operates with a minimum waste of the fruit.

A further object is to provide a machine of the character referred to which is rapid and efficient in operation, and of rugged and simplified construction.

A still further object is to provide a feeding device which automatically and uniformly aligns the pieces of fruit relative to their stem axes whereby they may be delivered to the stemming devices in accurately centered relation.

A further object is to provide a stemming device for fruit preparation machines which is of great rigidity and will effectively and neatly remove the stems from the fruit without waste of fruit.

A further object is to provide an improved peeling mechanism operable to follow closely the contour of a pear presented thereto and to remove a peel of uniform thickness irrespective of the size or shape of the fruit.

A further object is to provide a removable mounting for the peeling units whereby they may readily be removed and replaced.

A further object is to provide means operable in conjunction with the peeling means to retain the fruit firmly in operative position during the peeling operation without interfering with the action of the peeling mechanism.

A further object is to provide a splitting device onto which the fruit is transferred after it has been presented to the peeling mechanism.

A further object is to provide a splitting device having automatically actuated coring and trimming knives associated therewith whereby the splitting, coring and trimming is accomplished at a common station with simplified mechanism.

A further object is to provide an automatically actuated transfer mechanism operable to remove the fruit from the supports which present the fruit to the peeling mechanism, carry it onto the splitting device into operative relation with the coring and trimming knives, and thereafter release the fruit after completion of the coring and trimming operations.

A further object is to provide a coring knife adapted to separate the severed cores from the fruit as the fruit falls away from the knife.

A further object is to provide an ejector mechanism arranged to receive the fruit as it is released from the splitting and coring mechanism and automatically eject it from the machine.

Various other objects in addition to those specifically enumerated will, it is believed, best be understood and appreciated from a consideration of the following description, taken in connection with the accompanying drawings, wherein is illustrated a preferred embodiment of the invention especially designed for the preparation of pears.

In the drawings:

Figure 5 is a vertical sectional view transversely of the machine as viewed along the line 5—5 of Figure 2.

Figure 6 is an enlarged longitudinal sectional view taken through one of the stemming tubes and illustrating the manner in which the ejector mechanism is associated therewith.

Figure 7 is an end view of the stemming tube and its mounting as viewed from the left of Figure 6.

Figure 8 is a vertical sectional view transversely of the machine as viewed along the line 8—8 of Figure 2.

Figure 9 is a vertical sectional view taken along the line 9—9 of Figure 2.

Figure 10 is a side elevation, partly in section, of one of the peeling units, and illustrating the stop mechanism associated therewith.

Figure 11 is a plan view of the peeling unit and stop mechanism illustrated in Figure 10.

Fig. 12 is an end elevation of one of the peeling assemblies.

Figure 13 is a sectional view taken along the line 13—13 of Figure 12, illustrating the action of the peeling assembly in operation.

Figure 15 is a side elevation of the feeding device.

Figure 16 is a vertical sectional view taken longitudinally through the center of the feed mechanism.

Figure 17 is an end elevation of the shuttle block associated with the feed mechanism for actuating the impaling spindles.

Figure 18 is a sectional longitudinal section through the shuttle block as viewed along the line 18—18 of Figure 17.

Figure 19 is a fragmentary perspective view illustrating the arrangement of one of the pushers with respect to the spindle and spindle frame arm, with which it is associated, just before being carried into engagement with the latch block by which it is operated.

Figure 20 is a fragmentary perspective view of the same parts shown in Figure 19 illustrating the manner in which the pushers are actuated by the latch block.

Figure 21 is a longitudinal sectional view of the clamp assembly taken along the line 21—21 of Figure 8.

Figure 22 is a longitudinal sectional view of the clamp assembly taken along the line 22—22 of Figure 8.

Figure 23 is a cross sectional view through the clamp housing as seen along the line 23—23 of Figure 22.

Figure 24 is a cross section through the clamp housing taken along the line 24—24 of Figure 22.

Figure 25 is an elevation of the pawl which actuates the clamp latch.

Preliminary to a more detailed description of the machine illustrated, it may be stated in brief that it comprises an intermittently rotating turret provided with a series of stemming tubes upon which the pears to be operated upon are impaled and advanced. The pears are delivered to the stemming tubes by means of a rotary feeding device to which they are manually delivered and which is operated in timed relation to the turret to position the pears with their stem axes in alignment with the stemming tubes and impale them thereon. As the pears are carried away from the feeder by the stemming tubes they are successively presented to a series of peeling devices mounted upon a reciprocating carriage which is moved alternately toward and away from the turret in timed relation thereto so as to draw the peeling devices over the pears on the stemming tubes during the periods intervening between intermittent movements of the turret. After being presented to the several peeling devices, the peeled pears are then presented by the stemming tubes to a splitting and coring station where they are removed from the tubes and carried onto a splitting blade in operative relation with coring and butt trimming knives, which operate to cut out the cores and trim the butt ends of the pears. These latter devices complete the cycle of operations on the pears which, having been stemmed, peeled, cored, trimmed and split into halves, are then released into a discharge mechanism which ejects the finished halves from the machine.

The turret and drive

Figure 2:
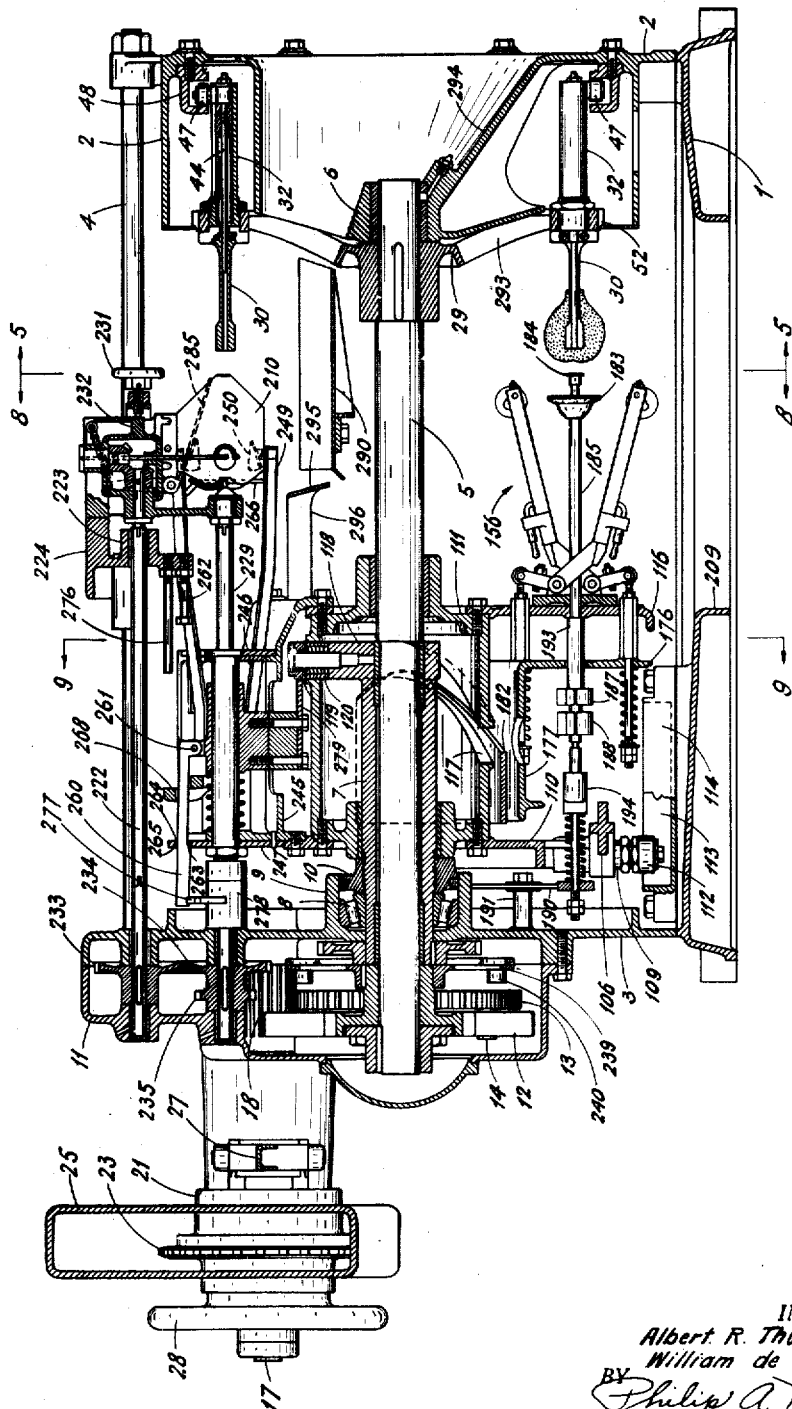
Figure 2 is a vertical sectional view taken along the longitudinal center line of the machine and illustrating the positions of the parts when the reciprocating carriage is in retracted position. For purposes of clarity only one of the peeling units mounted on the carriage is shown.
Figure 3:
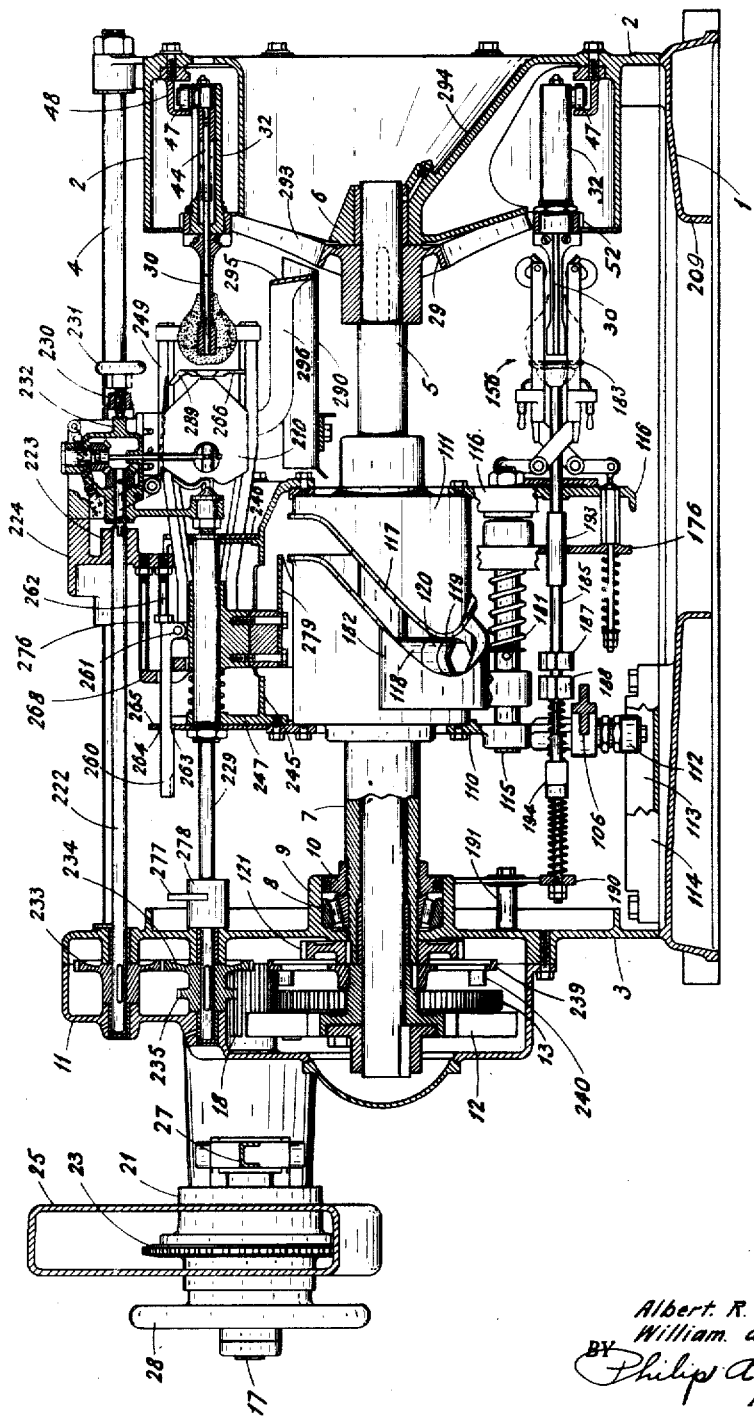
Figure 3 is a longitudinal vertical section similar to Figure 2, except that the cam cylinder and certain of its associated parts are illustrated in elevation; and this figure also illustrates the positions of the parts when the reciprocating carriage has been advanced to the end of its forward stroke.

With the foregoing general description in mind, the details of the mechanisms referred to will become apparent by first referring to Figures 2 and 3 wherein it will be seen that the machine includes a supporting framework made up of a base 1 upon which is mounted a pair of opposed end standards 2 and 3 rigidly interconnected by a pair of tie rods 4. Extending between, and supported by the end standards, is the turret shaft 5, rotatably journalled at one end in a bearing 6 carried by the end standard 2 and supported adjacent its other end by a sleeve 7 journalled in roller bearings 8 disposed within a bearing housing 9 formed integral with the end standard 3. A packing disc 10 may be screwed onto the sleeve 7 to close the open end of the bearing housing 9 and bears against the inner bearing race for adjusting the same.

Figure 1:
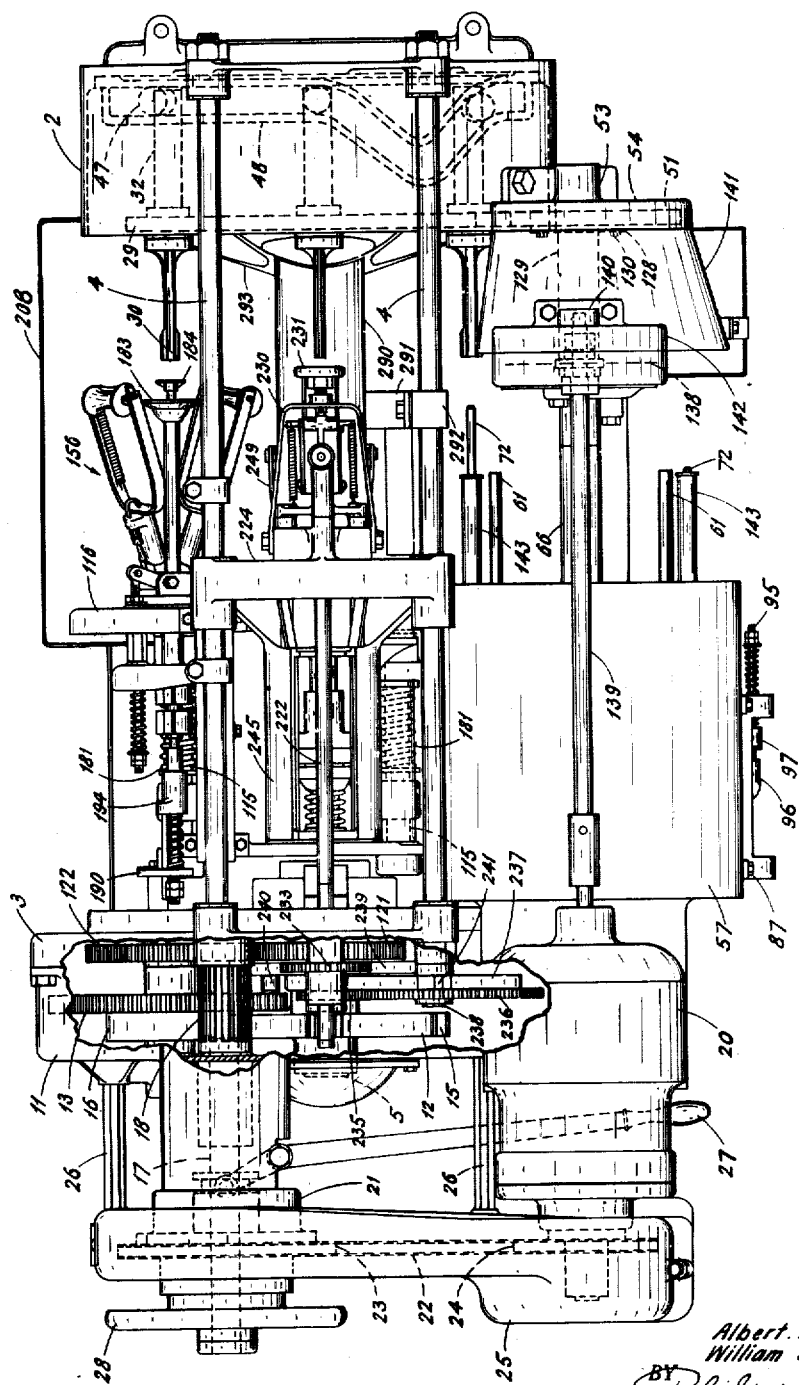
Figure 1 is a plan view of the machine with the upper portion of the gear cover broken away to disclose the arrangement of the main driving gears.

The turret shaft 5 projects beyond the end standard 3 into a gear chamber formed by a gear cover 11 secured to the outer flanged face of the end standard and is intermittently rotated one-sixth of a revolution at a time by means of a Geneva gear 12 keyed thereto (see Figures 1, 2, and 4) and actuated by the Geneva driver 13 carrying the usual driving roller 14 which engages with the radial slots 15 in the Geneva gear for driving the same. When the driving roller 14 is out of driving engagement with the Geneva gear the latter is locked against rotation by the locking ring 16 carried by the driver 13.

The Geneva movement described is driven from the continuously rotating main driving shaft 17 by means of a pinion 18 secured thereto which intermeshes with gear teeth 19 extending around the periphery of the Geneva driver 13. Power for operating the main drive shaft 17 may be supplied from an electric motor 20 through a clutch 21 by means of a chain 22 trained around the clutch sprocket 23 and motor sprocket 24. The chain 22 may be inclosed within a guard casing 25, mounted on supporting rods 26 projecting from the gear cover 11. As the clutch 21 may be of conventional type, it is thought unnecessary to disclose details of its construction. It is actuated into and out of engagement so as to connect or disconnect the drive sprocket 23 with the drive shaft 17 by means of a hand lever 27. A hand wheel 28 may be secured to the outer end of the driving shaft 17 so as to permit the machine to be turned over by hand if desired.

Fixed to the turret shaft 5 near the right hand end thereof, as viewed in Figures 2 and 3, is a turret 29 provided with an annularly arranged series of stemming tubes 30, six in all in the illustrated embodiment, upon which the pears to be operated upon are impaled, stem end first, by a feeding mechanism hereinafter to be described. The construction of the stemming tubes and the manner in which they are mounted on the turret is best illustrated in Figures 2, 3, 5, 6 and 7, wherein it will be seen that the tubes are substantially oval in cross section and provided with a pair of oppositely disposed longitudinally extending fins 31 which prevent the pears from turning about the stemming tubes after being impaled thereon. The forward edges of the tubes and fins are preferably ground to knife like edges so as to insure a clean cut in the flesh of the pears. It may be stated here that the arrangement of the splitting mechanism hereinafter to be described is such that the pears are split in half along a plane extending at right angles to the major width of the tubes; that is to say along the plane of the fins 31. In this manner the incision in the flesh of the fruit made by the fins does not show in the finished halves of fruit.

By making the stemming tubes oval in shape, and positioning the fins along their sides as shown, the strength of the tubes is materially increased so that they may be made sufficiently small as not to waste the fruit without sacrificing the rigidity necessary to prevent buckling in operation. Cylindrical tubes, on the other hand, involve the disadvantage that they must ordinarily be made oversize in order to provide the necessary strength and, consequently, take a larger cut than necessary, thereby wasting the fruit.

Each stemming tube has an ejector mechanism associated therewith which, as best seen in Figures 6 and 7, includes a tubular plunger housing 32 provided with a split clamp head 33 which serves as a holder for the tube. The turret 29 is provided with suitable apertures through which the plunger housings project, the latter being held in position by means of ring nuts 34 screwed onto the bodies of the housings and engaging with the rear face of the turret. The stemming tubes are removably mounted in the clamping heads 33, which are centrally bored to provide for the reception of the cylindrical rear ends of the stemming tubes, and are diametrically slotted as at 35 to receive the radial guides 36 on the tubes, which may be formed by rearward extensions of the fins 31. The clamping heads are drilled crosswise as at 37 and 38 for the reception of machine screws 39 and 40 which screw into tapped portions of the drilled holes and serve to draw the split parts of the clamping head together against the stemming tube guides to clamp the tubes firmly in place. The peripheries of the heads 33 may be notched as at 41 to accommodate the heads of the screws, and the fins are also notched as at 42 and 43 to clear any screws. It will be apparent that by the construction illustrated the stemming tubes may readily be removed from the clamping heads upon removal of the screw 40 and loosening of the screw 39.

Mounted for reciprocation with each stemming tube is an ejector rod 44 which is actuated by a plunger 45 slidably mounted in the plunger housing 32 and having a guide lug 46, upon which is mounted a cam roller 47 engaging with an annular channeled cam track 48 fixed to the end standard 2. The guide lug 46 reciprocates in a slot 49 extending longitudinally of the plunger housing so as to prevent the roller from falling out of engagement with the cam track. The configuration of the cam track (see Figure 1) is such that each cam roller is actuated thereby to advance and retract its associated ejector rod 44 through the stemming tube as the turret carries the latter from its topmost position to the next succeeding station, there being no pear on the stemming tube at this time as will hereinafter become apparent.

*The feeding mechanism*

For feeding the pears to the stemming tubes 30 and impaling them thereon in accurately centered position with respect to their stem axes, a mechanical feeding mechanism is provided which is operated in timed relation to the turret 29 to deliver the pears automatically onto the stemming tubes in properly aligned positions.

Such feeding mechanism (see Figures 1, 5, and 16) includes a drive shaft 50 extending longitudinally of the machine along one side thereof and intermittently rotated one-third revolution at a time in an anti-clockwise direction, as viewed in Figure 5, by means of a gear 51 secured to the shaft and intermeshing with gear teeth 52 formed around the periphery of the turret 29. The drive shaft 50 is journalled at one end in a bearing 53 carried by a bracket 54 secured to the end standard 2 and at its other end in a bearing 55 formed on the end closure 56 of a cylindrical cam housing 57. The cam housing may be secured to the end standard 3 as by means of bolts 58.

As best seen in Figures 8, 9, and 16, a pair of spindle frames generally indicated at 59 and 60 are mounted upon the drive shaft 50 within the cam housing 57, and are interconnected for rotation in unison by tie rods 61. The rear spindle frame 59 includes a hub portion 62 and a plurality of radially extending arms 63, three in all in the illustrated embodiment. The forward spindle frame 60 also includes a hub portion indicated at 64 and a plurality of radiating arms 65 corresponding in number to those of the rear spindle frame, but of slightly modified construction for a purpose to become more apparent hereinafter. The spindle frames are driven from the shaft 50 by means of a flanged coupling 66 pinned to the shaft and fastened to the forward spindle frame by cap screws 67 extending through slots 68 in the flanged portion of the couplings.

The arms 63 of the rear spindle frame are bored near their outer ends for the reception of guide rods 69 secured therein by set screws 70, and these guide rods project interiorly of and form guides for spindle sleeves 71 which are slidably mounted thereon. The spindle sleeves 71 are also slidably journalled in the forward spindle frame arms 65, which are suitably bored for their reception, and carry tubular spindels 72 pressed or sweated into their forward ends so as to be firmly secured thereto. The spindles 72 have their free ends sharpened to a knife like edge, as indicated at 73, and serve to receive the pears which are impaled thereon butt end first and carry them into properly centered relation to the stemming tubes 30 for transfer thereto.

The rear ends of the spindle sleeves 71 are adjustably mounted in split clamps 74 mounted integral with slide blocks 75 slidably journalled on the tie rods 61 which parallel the spindle sleeves and are rigidly secured in the spindle frames by set screws 76. Guide rods 77 may also be provided to assist in guiding and bracing the slide blocks, which latter, for this purpose, may be provided with arms 78 having semi-cylindrical bearings or yokes 79 formed on their outer ends to embrace the tie rods for sliding movement therealong.

The spindle sleeves 71 are axially reciprocated during rotation of the spindle frames so as to advance and retract the spindles 72 in timed relation to the operation of a centering mechanism shortly to be described so as to impale the pears thereon in correctly aligned positions as they are presented thereto by an operator and then present them to the stemming tubes 30 carried by the turret 29. This is accomplished in part by stationary cam plates 80, 81 and 82 secured to the inner surface of the cam housing 57 by spacer lugs 83, and partly by a reciprocating latch mechanism now to be described, all of which are arranged to operatively engage with roller cam followers 84 carried by the slide blocks 75.

The latch mechanism referred to (see Figures 9, 15, 17 and 18) is mounted on the outside of the cam housing 57 directly beside one of the positions at which the spindle sleeves come to rest at each idle period between the intermittent rotative movements of the spindle frames. Said mechanism includes a grooved shuttle block 85 slidably mounted on parallel guides 86 carried by a guide frame 87 secured to the outside of the cam housing over an opening 88 cut therein and through which the shuttle block projects. The rear face of the shuttle block carries a latch 89 pivoted to the block at 90 and having a hooked end formed by an arcuate cam finger 91 projecting upwardly from the body of the latch and provided with a bevelled portion 92. A spring 93 normally urges the hooked end of the latch outwardly away from the shuttle block.

The shuttle block 85 is normally retained in its extreme forward position, as illustrated in Figure 15, during the rotative periods of the spindle frames, and is reciprocated once during each stationary period of the spindle frames. Reciprocation of the shuttle block is effected by means of a shift arm 94 which is loosely connected to the shuttle block by means of a pin 95 carried by a boss 96 on the front of the block and slidably projecting through a bearing 97 in the upper end of the shift arm. A light coil spring 98 surrounds the pin between the face of the shift arm and a washer 99 held on the pin by means of jam nuts 100, which may be adjusted to vary the tension of the spring, as will be apparent.

The shift arm 94 (see Figure 9) is slidably journalled on a guide rod 101 extending longitudinally of the machine and secured in brackets 102 depending from a side rail 103 secured at one end to the under side of the cam housing 57 and at the other end to the bracket 54. The shift arm is provided with a gudgeon 104 at its lower end which engages a bearing 105 formed on one end of a horizontal rock arm 106 pivotally journalled intermediate its length on a vertical pivot stud 107 secured to the base 1. The opposite end of the rock arm 106 also carries a bearing 108 journalled on a guide post 109 depending from an end plate 110 (see Figures 2 and 3) secured to the rear face of a cam cylinder 111 slidably journalled on the turret shaft 5 and the sleeve 7 for axial reciprocation thereover. The guide post 109 is provided with a follower roller 112 at its lower end which engages a rectilinear groove 113 in a guide block 114 secured to the base 1, and serves to prevent rotation of the cam cylinder 111 about the axis of the turret shaft 5.

The cam cylinder 111 is separated intermediate its length to form two complementary sections rigidly held in spaced relation to each other by means of spacer rods 115 secured to the end plate 110 and to a carriage 116 secured to the forward end of the cam cylinder, thereby forming a cam groove 117 between the adjacent sections of the cam cylinder. Axial reciprocation is imparted to the cam cylinder 111 from the sleeve 7, which is rotatably journalled on the turret shaft 5 and carries a radially projecting post 118 on which is mounted a pair of cam rollers 119 and 120, the latter of which engages with the cam slot 117. The sleeve 7 is continuously driven through the medium of a gear 121 secured thereto and intermeshes with a gear 122 keyed to the continuously driven shaft 123.

As best seen in Figures 2 and 3, the cam slot 117 extends part way around the cam cylinder in a plane at right angles to the axis of the cylinder, and the remainder of its length includes a pair of reversely related angular portions. By this configuration of the cam slot it will be apparent that while the sleeve 7 rotates continuously, the cam cylinder itself is only intermittently reciprocated, since it is only actuated during part of each revolution of the sleeve. The disposition of the cam slot with relation to the drive mechanism is such that the cam cylinder remains stationary during rotative movements of the turret 29 and the feeding mechanism, and is advanced and retracted during the periods intervening between the intermittent rotative movements of the turret and feeding mechanism.

By the arrangement just described it will be seen that as each spindle 72 is carried by the spindle frames 59 and 60 into position A, as indicated on Figures 8, 9 and 15, and during the idle periods between intermittent rotative movements of the spindle frames, the shuttle block 85 is successively moved first to the left, as viewed in Figure 15, and then to the right, the spindle frames being stationary during this time. As the shuttle block moves to the left, the latch 91 rides over the adjacent cam roller 84 carried by one of the slide blocks 75 and snaps into place behind it. When the shuttle block is then moved back to the right, the latch engages the cam roller and yieldingly moves the slide block 75 to the right, thereby also advancing its associated spindle 72 to engage the blossom end of a pear presented to it by the operator. Upon reaching the forward or right hand end of its stroke, the shuttle block stops and remains idle during the succeeding rotative movement of the spindle frames, which brings the next succeeding slide block 75 and associated spindle into position for actuation by the shuttle block, which thereupon repeats the cycle of operations described.

For a proper understanding of the movements of the spindles and the purposes accomplished thereby throughout their cycle of rotation, it will be convenient to consider their operation in conjunction with the construction and operation of the centering mechanism which is cooperatively associated with the spindle mechanism and which operates in unison therewith. Such centering mechanism, best seen in Figures 5, 15 and 16, includes a stationary cam disc 124 surrounding the feeder drive shaft 58 and secured to a supporting standard 125 carried by the side rail 103 which extends alongside the machine. Mounted on the drive shaft 58 in opposed relation to the cam disc 124 is a drive disc 126, the face of which is held in spaced relation to the cam disc by a centrally arranged spacer boss 127. The drive disc is intermittently rotated by a flange 128 formed on its hub portion 129 and secured to the intermittently driven gear 51 by cap screws 130.

Mounted between the opposing faces of the discs 124 and 126 are three pairs of scissorlike centering blades 131 corresponding to the three spindles 72 and arranged in alignment therewith. The centering blades of each pair are provided with complementary notches 132 and are pivotally mounted on the drive discs 126 by studs 133. The edges of the notches 132 are preferably sharpened except at their apexes and for a short distance immediately adjacent thereto, at which places they are upset or dulled in order that they may clamp the stem portions of the pears therebetween in the manner shortly to be described. The inner ends of the blades are provided with oppositely disposed bosses 134 which hold the blades 131 in shearing relation, and the adjacent edges of the bosses are provided with intermeshing gear segments 135 whereby the blades of each pair are operated in unison. One of the blades of each pair is provided with an arm carrying a cam roller 136 which engages a cam slot 137 cut in the face of the stationary cam disc 124.

It will be seen that the centering blades 131 and the spindles 72 are rotated in unison and in aligned relation. The positions assumed by the several pairs of centering blades during each period between intermittent rotative impulses is shown in Figure 5, wherein the positions I, II and III correspond and are opposite the positions A, B and C, respectively, of the spindles 72, as indicated in Figure 8. As may be seen in Figure 5, the centering blades in position I are slightly overlapped so that the notches 132 form a restricted aperture. As each pair of blades comes to rest in this position the operator manually inserts the stem end or nose of a pear into the aperture formed by the notches, and supporting the body of the pear in his hand he aligns its blossom end with the corresponding spindle 72 at position A. As this is being done by the operator the spindle begins to advance toward the pear by the action of the shuttle block 85 engaging the cam roller on the slide block 75 and is finally brought into engagement with the pear, whereupon the latter, being now fully supported by the spindle and centering blades, may be released by the operator.

It is to be observed at this time that the connection between the shuttle block 85 and its actuating arm 94 is a yieldable one, by virtue of the spring 98 interposed therebetween, so that the spindle is yieldable during its advance. The purpose of this construction is to prevent the spindle at this time from penetrating to any substantial extent into the pear, which may not yet be fully centered therewith. This is due to the fact that the centering blades are supporting the pear at this time by engagement with its outer surface, and as the stems of pears do not always lie exactly axially of the bodies of the fruit, it is desirable to leave the pear free for such pivotal adjustment about the end of the spindle as may be necessary to bring the stem axis of the pear into proper alignment with the spindle.

Such adjustment is accomplished by the centering blades as they are advanced from position I to position II, during which time the corresponding spindle is moved in unison therewith from A to B, and the next succeeding spindle and its corresponding pair of centering blades are, of course, at the same time brought into the positions A and I for the reception of another pear in the same manner heretofore described.

As the centering blades are rotated from position I toward position II they are urged together in shearing relation by the cam roller 136 following the cam groove in the cam disc 124, so that the blades shear through the flesh of the pear supported therebetween and snugly grip the stem of the pear between the dulled apexes of the complementary notches 132, thereby positioning the pear with its stem axis in accurate alignment with the spindle. Being thus properly aligned with the spindle, the pear may now be firmly impaled thereon, and this is accomplished by the cam plate 80 with which the roller followers on the slide blocks 75 come into engagement during the latter portion of the travel of the spindle assemblies from position A to position B.

The latch finger 91 serves to hold the spindle in positive engagement with the pear until such time as the centering blades have cut into the fruit far enough to firmly support it, thus preventing release of the fruit by accidental retraction of the spindle before its roller follower comes into engagement with the cam plate 80.

As the centering blades and spindle assemblies approach positions II and B, respectively, the pear carried thereby is passed beneath a rapidly revolving circular knife 138 which cuts off a predetermined portion of the stem end of the pear, leaving it entirely supported by the spindle. The configuration of the cam slot between cam plates 80 and 81 is such that each spindle assembly is retracted a slight distance just after the end of the pear has been severed by the knife 138, which occurs immediately prior to the assembly reaching position B. This draws the body of the pear out of contact with the revolving knife and avoids any possibility of the latter wrenching the pear out of alignment on the spindle. The knife 138 is secured to a drive shaft 139 operatively connected at one end with the electric motor 20 and journalled at its other end in a bearing 140 carried by the semi-cylindrical centering blade guard 141 formed integral with the bracket 54. A safety guard 142 may be provided for shielding the knife 138.

The next advance of the spindle assembly and its corresponding centering blades carries them through another one-third revolution to bring them into position C and III, respectively, as indicated in Figures 5 and 8. During this movement the centering blades 131, having performed their function, are opened wide so as to clear the pear supported upon the spindle 72, which latter is further advanced by the cam plate 80 during its approach to position C so as to position the pear immediately adjacent the end of one of the stemming tubes 30, which is brought into alignment with the spindle at this time by the turret 29 operating in timed relation to the feed mechanism.

During the ensuing period prior to the next rotative movement of the turret 29 and the spindle assemblies, the pear is pushed off the spindle onto the stemming tube 30 aligned therewith. The mechanism provided for this purpose, as best seen in Figures 8, 16, 19, and 20, includes a tubular pusher 143, one of which is slidably mounted on each spindle sleeve 71, and each pusher is provided at its outer end with an annular flange 144 forming a pusher head for engagement with a pear impaled on the spindle 72. The rear end of each pusher tube carries a bracket plate 145 provided with a pair of rearwardly projecting lugs 146 and a bearing 147 slidably journalled on an extension of the guide rod 61. The pushers 143 are normally held in retracted position, as shown in Figures 16 and 19 by an annular flange 148 secured to the inner surface of the cam housing adjacent its open end, in which position the bearings 147 are received in recesses 149 in the spindle arms 65.

The pushers are actuated at the proper moment by means of a reciprocating latch block 150 mounted on the edge of the reciprocatory carriage 116 directly beside position C of the spindle assemblies and operative in a slot 151 cut in the cam housing 57. The latch block 150 is transversely channeled at 152 and in its retracted position, as illustrated in Figure 19, the channel is aligned with the path followed by the outer ends of the spindle arms 65 and pusher bracket plates 145 so as to receive them therein as they come to rest at position C. A pair of lugs 153 project upwardly from the latch block for engagement with the corresponding lugs on the bracket plates 145.

During the rest period of each spindle assembly at position C the latch block is carried first forwardly, as illustrated in Figure 20, and then rearwardly by the movement of the carriage 116 to which it is secured. As the latch block moves forwardly the lugs 146 on the pusher bracket plate 145 are engaged by the corresponding lugs 153 carried by the latch block 150, and the pusher is thereby advanced so as to push the pear off the spindle 72 onto the stemming tube 30 aligned therewith.

Upon reverse movement of the latch 150 its hooked end engages the bracket plate 145 and returns the pusher to its original normal position with respect to the spindle arm as shown in Figure 19. During the reciprocative movements of the latch block and pusher the spindle frames 63 and 65 are rigidly locked against any rotative movements such as might misalign the spindle 72 with the stemming tube 30 by means of a longitudinal groove 154 in the face of the latch block which slidably engages with a key 155 projecting from the outer end of each spindle arm 65.

Upon completion of the reciprocative movements of the latch block 150 and pusher 143, whereby the pear is transferred from the spindle 72 to the stemming tube 30, the spindle assembly is rotated back to position A, the turret 29 revolving at the same time to carry the stemming tube 30, with the pear impaled thereon, into operative relation with the first peeling unit and to bring another stemming tube into alignment with the next succeeding spindle as it arrives at position C.

During movement of the spindle assemblies from position C to position A the spindles 72 are retracted by the slide blocks 75, due to engagement of the cam rollers 84 with the angular edge of the cam plate 82 which, in conjunction with the adjacent edge of the cam plate 88, guides the cam rollers into position for subsequent engagement and actuation by the shuttle block 85.

*The peeling mechanism*

Under the intermittent rotative movements of the turret 29, each of the stemming tubes 30 is successively brought into registration with each one of a series of peeling units, which are actuated in timed relation to the turret to peel the pears presented thereto by the stemming tubes. Four such peeling units, generally indicated at 156 (see Figures 2, 3 and 8) are provided in the illustrated embodiment, these being mounted upon the face of the semi-circular carriage 116 in alignment with the path followed by the stemming tubes and with the same center to center spacing, so that each peeling unit is aligned with one of the stemming tubes during each interval between intermittent movements of the turret 29.

The construction of one of the peeling units is illustrated in detail in Figures 10 to 13, inclusive, and as they are all identical in construction a description of the one shown will suffice for all. Each unit includes a pair of yokes 157 carrying peeling assemblies between their outer ends which are generally indicated at 158. The yokes are mounted in opposed relation by means of swivel pins 159 carried by the yokes and journalled in bearings 160 provided for their reception in lever arms 161 of bell cranks 162. The bell cranks are journalled for rocking movement on shafts 163 transversely supported between spaced brackets 164 projecting from the base plate 165 which is bolted to the face of the carriage 116.

The yokes are removably secured to the bell crank arms 161 by means of hooked keepers 166 which engage countersunk depressions in the ends of the swivel pins 159. The keepers 166 are slidably mounted in bearing ears 167 formed integral with the bell crank arms 160 and carry thumb latches 168 pivotally secured thereto. When the latches are positioned as illustrated in full lines in Figure 10 the keepers are held in retracted position so that their hooked ends engage the countersunk depressions in the swivel pins 159 and hold the yokes 157 to the bell crank arms 161 without interfering in any way whatever with the pivotal motion of the yokes on their swivel pins. By pivoting the thumb latches 168 into position at right angles to the keepers it will be seen that the latter may be shifted so as to disengage them from the yokes, whereupon the latter, with their associated peeling assemblies, may be withdrawn from the arms 161 for replacement or repairs.

Leaf springs 169 are secured to the lever arms 161 and bear against the yoke arms to yieldably hold the yokes in normally opposed relation while at the same time permitting them to turn against the restraining action of the springs so that the peeling assemblies may follow the contour of the pears more readily.

In the retracted position of the peeling units, assumed during rotative periods of the turret 29, the yokes 157 are held apart, as seen in Figures 2 and 10. During the idle periods of the turret the peeling units are advanced toward the turret by the carriage 116, which is actuated at these times to carry the peeling assemblies 158 to the rear of the pears carried by the stemming tubes, whereupon the yokes are moved together to bring the peeling assemblies into operative relation with the fruit (see Figure 3). Upon reverse movement of the carriage 116 the peeling assemblies are drawn over the fruit to peel the same, and as the carriage again reaches its retracted position the yokes are moved apart in readiness for their next reciprocative movement.

The yokes are moved toward and away from each other at the proper times by means of eye bolts 170 pinned between the bifurcated ends of the lever arms 171 of the bell cranks 162 and threaded into elongated collars 172 formed integral with the forward ends of actuating rods 173. The actuating rods project rearwardly through apertures 174 in the carriage 116 and openings 175 in the flanged head 176 (see Figures 2, 3 and 9) of a semi-cylindrical cam carrier 177 slidably journalled beneath the cam cylinder 111 on the spacer rods 115. Coil springs 178 surrounding the rear portions of the actuating rods 173 bear against the head 176 and are held on the rods by adjusting nuts 179 which may be adjusted to vary the tension of the springs. Adjustable stop pins 180 are provided in the bell crank arms 171 for engagement with the base plate 165 to limit the extent to which the yokes may be closed together.

Heavy coil springs 181 surrounding the spacer rods 115 normally urge the cam carrier 177 forwardly so that its head 176 engages the collars 172 on the actuating rods and holds the peeling unit yokes in separated relation, as shown in Figures 2 and 10. The cam carrier 177 is actuated by means of a cam plate 182 secured to the carrier in position for engagement by the cam roller 119 carried by the sleeve 7.

The edge of the cam plate 182 normally projects beyond the edge of the cam slot 117 in the cam cylinder 111 and extends substantially parallel thereto, except adjacent its extremities where it recedes from the cam slot more or less gradually so that the cam roller 119 will not engage and disengage therewith too abruptly.

By the construction just described it will be seen that when the cam cylinder 111 is in retracted position, as illustrated in Figure 2, the coil springs 181 act upon the head 176 to cause the latter to engage the collars 172 on the actuating rods 173 and thereby hold the yokes 157 in separated position. The yokes are maintained in this position as the carriage 116 is advanced by the cam cylinder until just at the end of the forward stroke of the cam cylinder, at which time the cam roller 119 rides onto one end of the cam plate 182, thereby shifting the carrier 177 rearwardly with respect to the cam cylinder against the action of the coil springs 181. This rearward shifting of the carrier 177 causes its head 176 to compress the springs 178 on the actuating rods 173 whereby the yokes are yieldably urged towards each other to bring the peeling assemblies 158 into operative relation with a pear carried by one of the stemming tubes. (See Figure 3.) Throughout the rearward movement of the cam cylinder the cam roller 119 continues to engage the cam plate 182 so that the peeling assemblies are held in engagement with the fruit and drawn thereover to remove the peeling therefrom. As the cam cylinder again reaches its retracted position, the cam roller 119 rides off the end of the cam plate 182, whereupon the coil springs 181 push the carrier 177 forwardly to open the yokes in readiness for a repetition of the cycle of movements just described.

In order to prevent the fruit from being pulled off the stemming tubes by the peeling assemblies as the latter are drawn over the fruit, a stop mechanism is associated with each peeling unit and is operable in timed relation therewith to bear against the butt ends of the pears during the peeling operations. Each stop mechanism, as best seen in Figures 10 and 11, is of a dual character, including an outer cup shaped head 183 and an inner head or button 184 which seats within a recess 183a in the center of the head 183. The head 183 and the button 184 of each stop mechanism are respectively secured to the forward ends of a tube 185 and a rod 186 slidably mounted within the tube. Both the tube 185 and the rod 186 therewithin project between the yokes 157 and extend freely through the base plate 165, carriage 116, and carrier head 176, and are operated by mechanism shortly to be described in timed relation with each other and with the peeling unit in such manner that on the forward stroke of the peeling assembly the head 183 and button 184 are simultaneously brought into juxtaposition with the butt end of the pear to be peeled, and on the rearward or peeling stroke of the peeling unit they remain in this position until just prior to the completion of the peeling operation, at which time they are successively retracted,—first the head 183 and then the button 184.

The purpose of the dual construction and operation of the stop mechanisms will become apparent when it is understood that pears, as they are put through the machine in commercial practice, may, and frequently do, vary considerably in degree of maturity, and many of the riper pears are quite soft. In order to prevent the softer pears from being pulled over the stop member by the thrust of the peeling assemblies, such stop member must be large enough to engage a considerable area of the butt ends of the pears. Hence the provision of the outer cupped head 183. On the other hand, the size of the head 183 required for the purpose mentioned is such that it must be withdrawn well before the peeling assemblies run off the butt end of the fruit in order to prevent interference with the peeling knives and consequent damage thereto, as well as premature deflection of the knives out of engagement with the fruit.

To permit withdrawal of the larger head 183 somewhat before the end of the peeling stroke of the peeling assemblies, and yet hold the pear throughout the remainder of the peeling stroke without interfering with the peeling knives, is the function of the smaller stop button 184. It will be understood that, while the small size of the button 184 required to avoid interference with the peeling assemblies is such that it cannot be relied upon to hold the fruit during the major portion of the peeling stroke without the possibility of some of the softer pieces of fruit being pulled over it, at the same time it is adequate to hold the fruit during the latter part of the peeling stroke during the travel of the peeling knives down the butt end of the pear since the pull of the knives on the fruit is diminished at this time. Thus the larger cupped head 183 provides an adequate bearing surface for the fruit during the major portion of the peeling stroke, and yet may be withdrawn out of the way of their peeling assemblies during the latter part of their peeling stroke while leaving the fruit firmly held on the stemming tubes during the remainder of the peeling stroke by the button 184 which is small enough so as not to interfere with the peeling operation and need not be retracted until the peeling stroke is substantially completed.

The mechanism for actuating the stop mechanisms in the manner described includes a pair of clamp collars 187 and 188, adjustably secured to the tube 185 towards its rear end. A guide pin 189 projects rearwardly from the collar 188 and slidably extends through an arcuate bracket 190 bolted to the end standard 3 and held in spaced relation thereto by spacers 191. The guide pin 189 serves to prevent rotation of the tube 185 and its head 183, while a spring 192 surrounding the guide pin between the collar 188 and bracket 190 tends to urge the tube 185 forwardly toward the turret 29.

A sleeve 193 slidably surrounds the tube 185 and is engageable by the rear face of the carriage 116 on the rearward movement of the carriage, whereby the sleeve is pushed along the tube and into engagement with the collar 187 so as to retract the tube against the urge of the spring 192. The time of actuation of the tube 185 may be regulated by adjustment of the collar 187, and the tension of the spring 192 by adjustment of the collar 188.

The rod 186 projects rearwardly from the tube 185 and is slidably journalled in the bracket 190. A collar 194 is firmly secured to the rod 186 and a guide pin 195, projecting rearwardly from this collar, slidably extends through the bracket 190. The guide pin 195 serves to prevent rotation of the rod 186 and button 184, and a spring 196 surrounding the rod 186 between the bracket 190 and collar 194 tends to urge the rod 186 forwardly toward the turret 29 to the limit permitted by the lock nuts 197 on the rear end of the rod. By reason of the engagement of the button 184 with the head 183, the lock nuts 197 also determine the forward position of the head 183.

By the arrangement just described it will be apparent that when the carriage 116 moves forwardly into position shown in Figure 3 the springs 192 and 196, acting against the collars 188 and 194, respectively, advance the tube 185 and rod 186 simultaneously to position the head 183 and button 184 adjacent the butt end of the pear on the stemming tube 30, such position being determined by the stop nuts 197. The tube 185 and rod 186 remain in this position during the rearward movement of the peeling assemblies until just as the latter is about to come into engagement with the head 183. By this time the peeling assemblies have passed over the forward part of the bulbous portion of the fruit and are starting, or have started, down its butt end. At this point in the operation of the machine the rear face of the carriage 116 pushes the sleeve 193 into engagement with the collar 187 and retracts the tube 185 and its head 183 in unison with the peeling assemblies, thereby preventing the head 183 from contacting with the peeling assemblies. The button 184, however, remains in engagement with the pear until just as the peeling assemblies run off the butt end thereof and before they engage the button 184, at which time the rearwardly moving tube 185 strikes the collar 194 and causes the retraction of the rod 186 and button 184 in unison with the tube 185 and peeling assemblies throughout the remainder of the rearward stroke of the carriage 116. Thus the stops 183 and 184 effectively serve to prevent the pears from being pulled off the stemming tubes, while at the same time they are so actuated as not to interfere with the peeling assemblies.

The construction and arrangement of the peeling assemblies constitute important features of the present invention as effective and efficient peeling is largely dependent thereon. As best seen in Figures 10 to 13, inclusive, each peeling assembly includes a pair of opposed supporting brackets 198 provided with pivot pins 199 by which they are pivotally journalled in the outer ends of the yoke arms 157. The brackets 198 are interconnected by a shaft 200 extending transversely therebetween and upon which a concave guard roller or spool 201 is rotatably journalled. A peeling knife 202 having a cutting edge 202a also extends transversely of the brackets 198 in closely adjacent relation to the surface of the roller 201 and is clamped to the brackets at its opposite ends by means of machine screws 203. The intermediate portion of the knife is arcuate in shape so as to conform to the contour of the guard roller.

A light spring 204 is associated with each assembly and is secured at one end to a pin 205 provided upon one of the brackets 198 and at its other end to a lug 206 projecting from one of the yoke arms. This spring supplies the necessary amount of pressure for holding the peeling knife in engagement with a fruit to be peeled and normally holds the peeling assembly, as illustrated in Figure 10, in such position that the knife edge trails behind the roller axis so that the roller always travels over the surface of the fruit in advance of the knife. A stop pin 207 is slidably mounted in the lug 206 and journaled at one end on pin 205 and serves to prevent the peeling assembly from being rotated into inoperative position.

Having pointed out the structural elements of the peeling assembly, it will be well to note the particular structural features of these elements as well as their cooperative relation which contributes to the successful operation of the assembly.

First, it may be of assistance in understanding the assembly and its operation if the two opposite brackets 198 and their interconnecting shaft 200 be considered as constituting a unitary frame having a pivotal axis extending centrally through the pivot pins 199. By this arrangement, the entire frame structure will be free to swing about its pivotal axis.

Second, the interconnecting shaft 200, which forms an element of the assembly frame, is arranged parallel to the pivotal axis of the frame and is spaced therefrom or, as may be stated, is eccentric thereto. As the concave guard roller is journaled upon this shaft, it follows that its rotative center will be eccentric to or spaced from the pivotal axis of the assembly frame.

Third, the peeling knife, which may be formed of a relatively thin piece of strip metal, is fastened at its ends to the opposite sides of the assembly frame. The knife is arcuate, or bowed in form, and has a curvature similar to the curve of the concave surface of the guard roller, whereby throughout its effective length its cutting edge will be substantially equidistant from the adjacent periphery of the roller, thus gauging the depth of cut which may be taken by any portion of the knife.

Fourth, it is important to mount the peeling knife upon the assembly frame so that its cutting edge will lie substantially in a plane which intercepts the rotative center of the roller and the pivotal axis of the frame and to locate the middle point or apex of the cutting edge of the knife substantially coincident with the pivotal axis of the frame, whereby the turning of the frame caused by the guard roller traversing the irregular curved surface of the fruit will not force the cutting edge of the knife deeper into or from the fruit under treatment but will merely act to steer or direct the cutting edge of the blade in the direction of change of curvature of the fruit surface, and thus will insure removing from the fruit a smooth even peeling of substantially uniform thickness.

As illustrated in Figure 13, the cutting edge of the peeling knife may be slightly divergent from the previously mentioned plane. In this figure the apex of the cutting edge has been moved slightly to the rear of this plane but, even so, it may be considered as lying substantially within the plane and in line with the pivotal axis of the frame. This slight divergence of the apex of the cutting blade will cause a very slight displacement of this edge as the assembly is turned by the guard roller but this divergence is so small as to be negligible. However, the apex of the cutting edge should not be moved any substantial distance from the mentioned plane, as otherwise the turning motion of the assembly caused by the guard roller meeting a change in curvature of the fruit under treatment may cause the knife to either dig too deeply into, or completely ride out of the fruit, thus resulting in an uneven peeling operation or leaving portions of the fruit unpeeled.

Likewise the apex of the cutting edge of the peeling knife may be positioned slightly above or slightly below the center line of the pivotal axis of the frame without materially affecting the peeling action of the knife. The importance of locating the apex of the cutting edge at, or substantially at, the pivotal axis of the frame resides in the fact that the thrust of the fruit against the knife during the peeling operation is thereby directed against the pivotal axis of the assembly. As a result thereof this peeling thrust has substantially no tendency to rotate the assembly and thereby cause the knife to be lifted out of the fruit, particularly if the latter happens to be so hard as to offer unusual resistance to the knife.

It will be understood that the major portion of the peeling operation is performed by the section of the knife immediately to each side of the apex of the cutting edge, so that the thrust of the fruit is more or less concentrated at the apex of the knife. Since the apex of the knife, as pointed out above, is in the line of travel of the pivotal axis of the assembly, the peeling thrust is exerted directly against the pivotal axis of the assembly so that it has no tendency to rotate the assembly. The outer portions of the knife more remote from its apex act only when the knife passes over the bulbous portion of the fruit, and thus the thrust of peeling against the off center portions of the knife assist the guard roller at this time in turning the assembly around the butt end of the fruit.

It will now be appreciated that the guard roller performs two important functions. First, to gauge the depth of peel taken by the knife, and second to steer or turn the knife to follow closely the irregular contour of the fruit, as the roller alone controls the turning of the peeling assembly.

Fifth, another important feature of the peeling assembly is the angular mounting of the peeling knife (Figure 13) whereby several important advantages are obtained. The first advantage obtained by angularly mounting the peeling knife results in making it possible to form the cutting edge by beveling the fruit engaging face of the blade. This beveled portion 202b extends rearwardly from the cutting edge of the knife and is preferably made parallel to the line of travel of the knife so as to form a heel for riding engagement with the fruit (Figure 13). The bevelled portion 202b lies in a plane which is parallel to a similar plane which is tangent to the directing surface of the guard roller and is spaced from this tangent plane a predetermined distance which more or less represents the thickness of the peel to be removed from the fruit.

Due to this relation of the beveled portion of the knife to the directing surface of the roller, the beveled portion of the knife will be inclined to the surface of the fruit when first brought into engagement therewith and as a result thereof the cutting edge of the knife will enter the fruit until the beveled portion thereof moves into parallel relation with the direction of travel of the knife, and will alter its course only when the guard roller steers the knife in another direction. In other words, during the peeling operation the beveled portion or heel of the peeling knife automatically acts to maintain itself in a plane parallel to its direction of travel, and the guard roller in turn acts to determine this direction of travel from the surface of the fruit under treatment, whereby the knife will travel through the fruit and will remove therefrom a peeling of substantially uniform thickness, which thickness will be substantially equal to the distance from which the directing surface of the guard roller is offset from the plane which includes the beveled surface of the knife. As the knife and guard roller are both similarly curved, it will be understood that the plane which includes the beveled surface of the knife will be correspondingly curved and that the arcuate directing surface of the guard roller will be substantially parallel to this plane but offset therefrom a predetermined distance.

Another advantage obtained by angularly mounting the peeling knife from the supporting frame results from the tilting of the rear portion of the knife out of the line of travel of the beveled surface thereof. Due to the angularity of the beveled portion 202b with respect to the plane of the knife 202, it will be seen that as this beveled portion assumes a plane parallel to its direction of travel the rear portion of the knife is thereby tilted away from the fruit. The assumption of this portion by the knife is of considerable importance because of the fact that many pears are of such shape that the juncture between the butt or bulbous portion of the fruit, and the neck or stem portion is very sharply curved, and if the rear portion of the knife is not sufficiently tilted clear of the fruit it may drag on the fruit and thereby act as a fulcrum to lift the cutting edge of the knife and cause it to run out of engagement with the fruit, whereby a portion of the fruit may be left unpeeled. By angularly mounting the peeling knife upon the frame assembly and beveling it as described, the knife is automatically maintained in such tilted position as to keep its rear edge clear of the fruit at all times and, consequently, the cutting edge of the knife will be free to continue its peeling action over all portions of the fruit, with the result that the fruit will be evenly and cleanly peeled for the full stroke of the peeling assembly.

Sixth, it is desired to remove from the peeling assembly as much of the unbalanced weight as is possible so that as this assembly is swung into operative position by its supporting yoke it will not be turned on its pivotal axis from its correct peeling position by the energy stored in the unbalanced portion of the assembly as it is accelerated or de-accelerated by the yoke, and for this reason the guard roller shaft 200 has been made the principal means for interconnecting the opposed supporting members 198, thereby making it unnecessary to provide other interconnecting means which would add greatly to the unbalanced weight of the assembly. Of course, the peeling knife also connects members 198, but due to its form and relative flexibility could not be counted upon for maintaining the supporting members in correct operative relation, although it may assist in doing so to a certain degree. The unbalanced weight of the peeling assembly may be counterbalanced to overcome this objection, but to do so would add more weight to the assembly, which would be undesirable. By constructing the peeling assembly as described and illustrated, the objectionable turning moment of the unbalanced weight has been satisfactorily overcome.

Seventh, as may be observed in Figure 10, the light coil spring 204 is connected to the peeling assembly in alignment with the pivotal axis of the supporting members 198 and, due to this arrangement acts to maintain the assembly in its normal position, in which position the cutting edge of the knife trails behind the directing surface of the guard roller (note Figures 10 and 13). The rotation of the peeling assembly in either direction from its normal position will be yieldingly resisted by this spring.

As the pears impaled on the stemming tubes 30 are advanced in step by step fashion by the intermittent rotative movements of the turret 29, each is successively presented to each peeling unit in turn. The several peeling units are so positioned that each operates upon a different portion of the pears, so that the aggregate action of all of the peeling units results in the removal of substantially the entire peeling, excepting only a small portion left in the blossom end depression, which is subsequently removed by mechanism shortly to be described. Trash pans 208 may be provided to receive the peels and discharge them through a spout 209 to any suitable point of disposal.

*The splitting, coring, and trimming mechanism*

After being acted upon by the last peeling unit, the next movement of the turret brings the stemming tubes into alignment with a splitting, coring and trimming unit, to which the pears are transferred from the stemming tubes by means of a transfer mechanism presently to be described.

As best seen in Figures 2, 3, 26, and 27, the splitting, coring and trimming unit comprises a splitting blade 210 having knife-like forward edges 211 and secured to the underside of a gear housing 212 in position for axial alignment with one of the stemming tubes 30 during each rest period of the turret 29. As hereinbefore stated, the relative positions of the stemming tubes and the splitting blade 210 is such that when they are brought into alignment the fins 31 of the stemming tubes lie in a common plane with the splitting blade 210. An arcuate coring knife 213 is rotatably mounted in an opening 214 in the body of the splitting blade, which latter is also slotted as at 215 for the reception of the shank of the knife. The coring knife is provided with a pivot pin 216 journalled in the splitting blade, and is driven by a bevel gear 217 journalled in the gear housing 212.

Figures 29, 30:
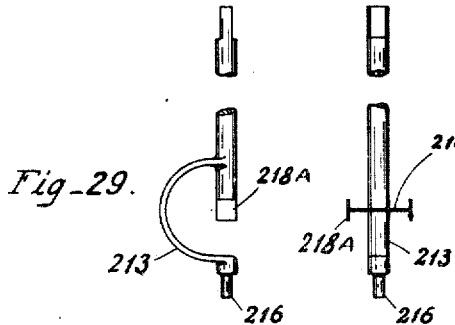
Figure 29 is a side elevation of the coring knife.
Figure 30 illustrates the coring knife as viewed from the right of Figure 29.

As best seen in Figures 29 and 30, the shank of the coring knife is extended into the sphere of revolution of the knife and carries a core loosening device on its end including radial impaling arms 218 extending transversely of the coring knife and carrying sharp edged fins 218A at their outer ends. The purpose of this construction is to separate the severed cores from the fruit sections after completion of the coring operation, this being accomplished by the arms and fins which impale the severed core sections of the fruit and hold them when the halved fruit falls from the splitting blade after its release by the transfer mechanism. The core sections are then knocked off the arms by the next pear as it comes onto the splitting blade.

The bevel gear 217 on the shank of the coring knife is driven by a second bevel gear 219 intermeshing therewith and secured to a stub shaft 220 journalled in the gear housing 212. The stub shaft 220 has a key 221 on its outer end for driving engagement with a corresponding slot cut in the end of a counter shaft 222, which is journalled near one end in the end standard 3 and at the other end in a bearing 223 carried by a bridge 224 which is rigidly secured to the tie rods 4.

A curved butt trimming knife 225 is mounted on one end of a stub shaft 226 in closely adjacent relation to the rear edge of the splitting blade for operative engagement with the butt ends of the pears as they are positioned on the splitting blade in coring position, and operates to trim the ends of the pears during the coring operation. The stub shaft 226 is journalled in a bracket 227 depending from the gear housing 212 and also carries a key 228 on its outer end for driving engagement with a corresponding slot cut in the end of a second counter shaft 229 journalled in the end standard 3.

The purpose of the key and slot driving relation between the respective counter shafts 222 and 229 and the stub shafts 221 and 226 is to permit disengagement thereof should it be desired to remove the coring and splitting unit for replacement with a substitute unit as, for example, in the event of a broken coring or trimming knife. The coring and splitting unit is removably mounted in operative position by means of a yoke 230 pivoted at its ends to the bridge 224 and carrying a hand screw 231 engageable with a countersunk boss 232 on the gear housing 212. It will be apparent that by loosening the hand screw 231 and lifting the yoke 230 the coring and splitting unit is thereupon free for removal.

The counter shafts 222 and 229 are interconnected for operation in unison by intermeshing gears 233 and 234, respectively, (see Figures 2 and 4) and are driven by a pinion 235 carried by the shaft 229 and intermeshing with a ring gear 236 secured to the face of a modified Geneva gear 237, which is mounted on a supporting shaft 238 secured at one end to the end standard 3. The Geneva gear 237 is actuated by a Geneva driver 239 secured to the turret shaft 5 and provided with a peripheral series of driving rollers 240 for engagement with the slots 241 of the Geneva gear. The ratio of the gears 234, 235, and 236 is such that the counter shafts 222 and 229 are each rotated a single revolution by each movement of the Geneva 237.

It will be observed that the Geneva movement, including Geneva gear 237 and driver 239 differs somewhat in construction from the conventional Geneva movement, the primary reasons for the modifications being to provide for the completion of the coring and trimming operation sufficiently in advance of each forward movement of the cam cylinder 111 so that enough time will be left for clearing the transfer mechanism of the completed fruit before it is actuated to transfer another fruit to the splitting blade.

To this end the Geneva gear 237 is so constructed and actuated in the present embodiment as to begin and complete each movement during the initial approximately two-thirds of the time of each advance of the turret 29, which latter is actuated by the conventional geneva 12. It will be seen that the Geneva driver 239 is provided with six driving pins 240 which cooperate with four driving slots 241 in the Geneva gear 239, and no locking ring is employed as in conventional Geneva movements since the Geneva driver 239 itself is only intermittently actuated, and one of the driving pins 240 is always in engagement with one of the slots 241.

Figure 4:
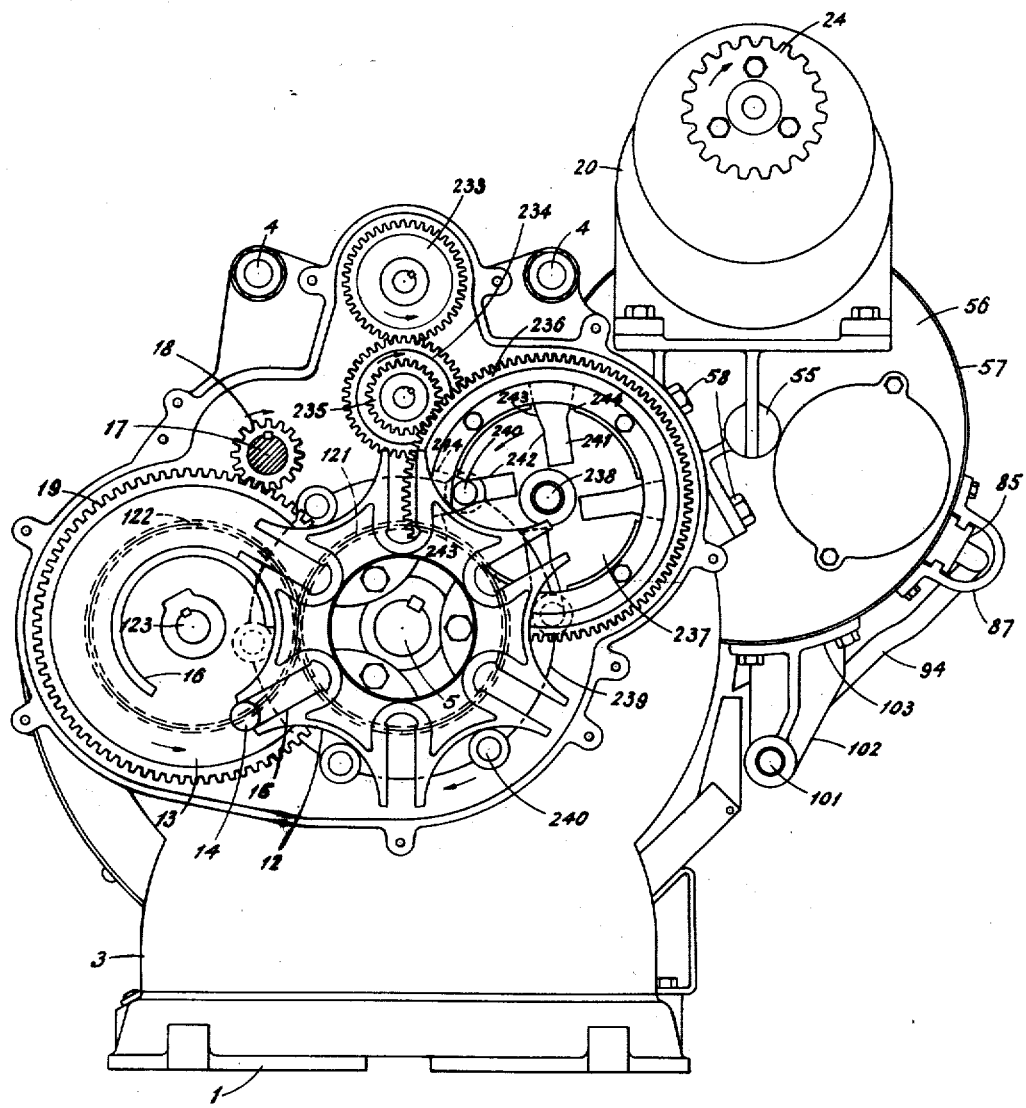
Figure 4 is an end elevation of the left hand end of the machine with the gear cover and parts outwardly thereof removed to illustrate the arrangement of the driving gears.
Figure 14:
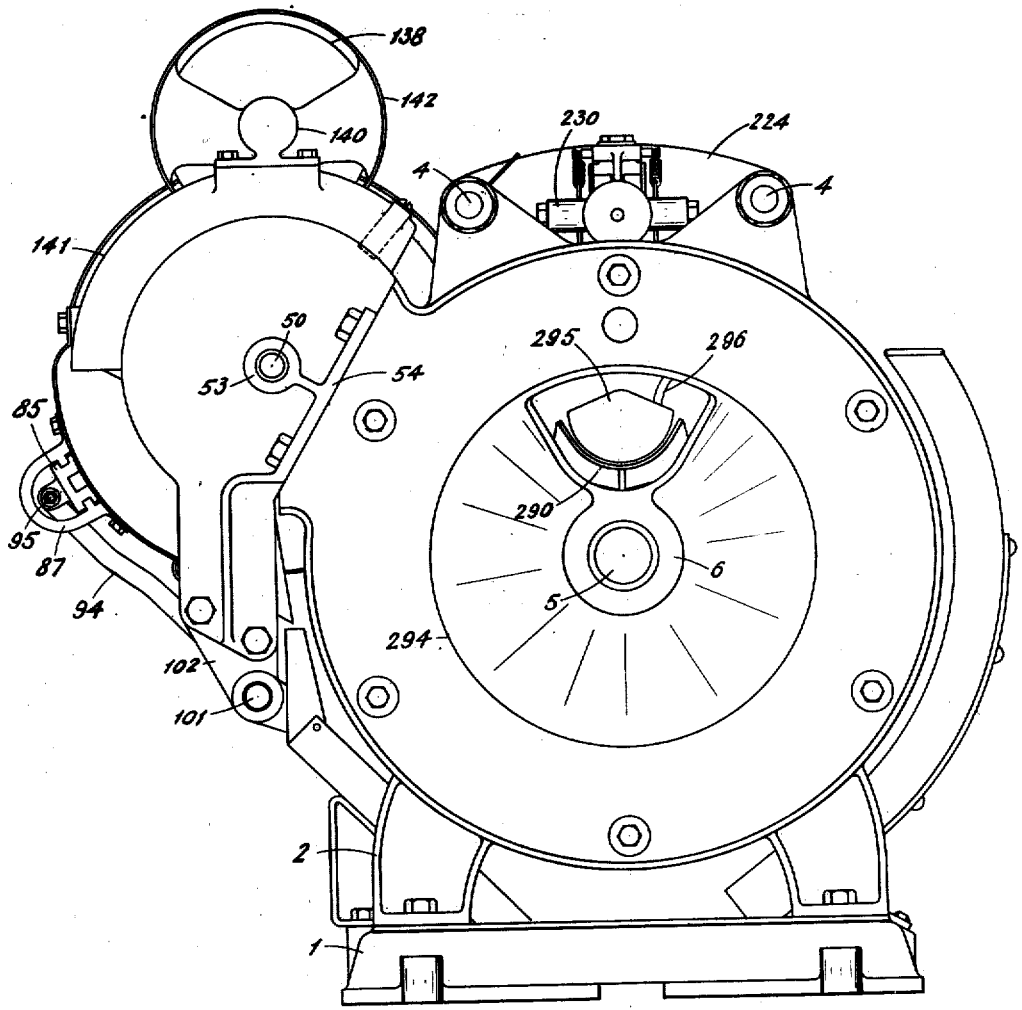
Figure 14 is an end elevation of the right hand or discharge end of the machine.
Figure 26:
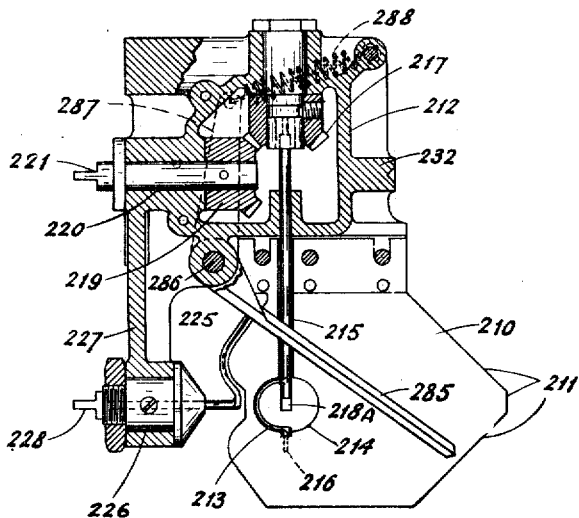
Figure 26 is a side elevation, partly in section, of the splitting, coring and trimming unit.
Figure 27:
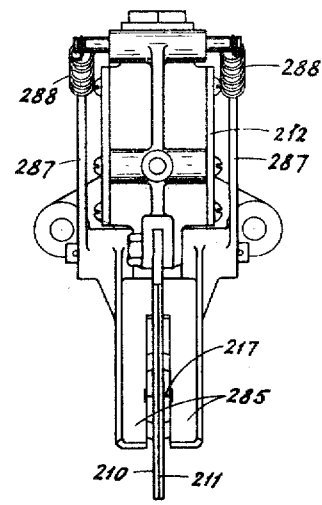
Figure 27 is an end elevation of the splitting unit shown in Figure 26.
Figure 28:
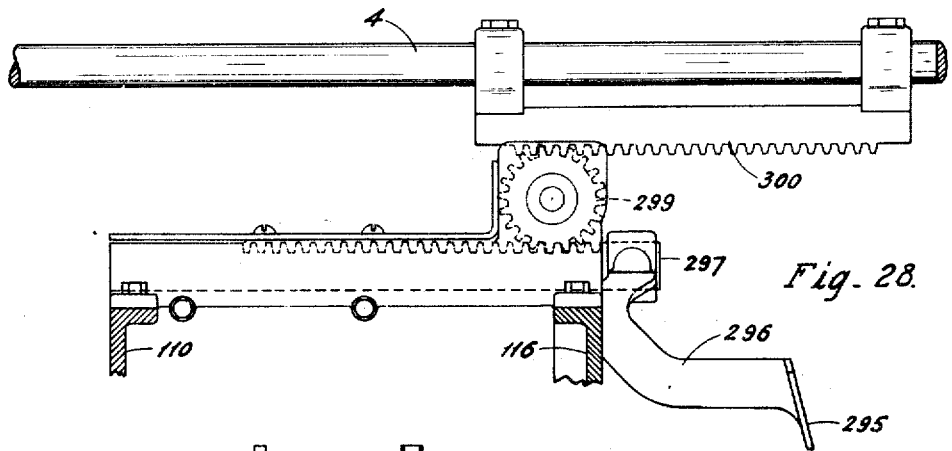
Figure 28 is a side elevation of the ejector mechanism as viewed along the line 28—28 of Figure 8.

Figure 4 of the drawings illustrates the positions of the parts just at the beginning of one of the movements of the conventional geneva 12 which drives the turret shaft 5. At this time one of the driving pins 240 has already partially entered one of the Geneva slots 241 and the next preceding pin is just ready to run out of the preceding slot. Each of the slots 241 includes parallel rectilinear edges 242 and arcuate edges 243 and 244. The center of curvature of each of the arcuate edges 243 and 244 is taken from the center of the turret shaft 5 in such manner that as the driving pins 240 enter and leave the slots along these edges no movement is imparted to the geneva 239. Thus the entry of the driving pin into the upper slot to the point shown in Figure 4 has not caused any movement of the geneva 239 because the center of curvature of the slot edge 244 is the same as that followed by the driving pin 240.

As the main geneva 12 is now actuated, the driving pin 240 runs into the slot 242 beyond the arcuate edge 244 and thereby rotates the geneva 239. It will now be observed that the Geneva slots 242 are not radial but are canted backward with respect to the direction of rotation of the Geneva gear, and the effect of this is to advance the time of maximum acceleration of the geneva ahead of the time of maximum acceleration of the driving pin 240, and provides a smooth deceleration of the geneva to the point where the driving pin reaches the arcuate edge 243 in runnig out of the slot. As the driving pin 240 reaches this point the geneva 239 is brought to a stop, since the curvature of the edge 243 of the Geneva slot is the same as that of the path followed by the driving pin 240. Back lash is prevented by the next succeeding driving pin, which enters the succeeding slot just as the preceding pin reaches the arcuate edge 243.

From the foregoing it will be apparent that the modified geneva 239 begins each movement simultaneously with the main geneva 12, but completes its movements in advance of the main geneva. Thus each coring and trimming operation is completed prior to the time the turret comes to rest to present another pear to the splitting blade, thereby affording time for actuating the transfer mechanism to clear it of the completed fruit before it is actuated to transfer another fruit.

*The transfer mechanism*

The transfer mechanism provided for removing the pears from the stemming tubes and presenting them to the splitting, coring and trimming unit (see Figures 2, 3, and 21 to 24) includes a cylindrical clamp housing 245 secured to the top of the cam cylinder 111 for reciprocation therewith and provided with front and rear end closures 246 and 247, respectively. The front end closure 246 is provided with radial slots 248 which act as guides for four clamp arms 249 projecting therethrough and carrying concave clamp blocks 250 pivoted to their outer ends as at 251. The inner ends of the clamp arms 249 are pivotally secured to bifurcated ears 252 projecting radially from a sleeve block 253 which is slidably journalled on a tube 254 extending axially of the housing 245 and forming a bearing for the counter shaft 229 over which the tube is free to slide. A coil spring 255 surrounds the tube 254 between end closure 247 and the sleeve block 253 and normally urges the latter toward the forward end of the housing 245.

The clamp arms 249 are preferably provided with angular sections 256 which, as they are drawn inwardly and outwardly through the guide slots 248 by movement of the sleeve block 253, draw together or separate the clamp blocks 250 accordingly. Four locking plungers 257, corresponding to the four clamp arms, are slidably mounted in guides 258 formed on the inner surfaces of the housing 245. Each locking plunger is mounted to bear against one of the clamp arms, and the several plungers are held outwardly in engagement with the clamp arms by means of coil springs 259.

As the clamp arms are carried toward the turret 29 on each forward movement of the cam cylinder 245 they are held in separated position by the action of the spring 255 until just prior to the end of their forward stroke, when the clamp blocks arrive in operative position with respect to a pear presented thereto by one of the stemming tubes. At this point the forward end of a latch arm 260 (see Figures 2 and 3), pivoted to the sleeve block 253 at 261, comes into engagement with a stop pin 262 projecting rearwardly from the bridge 224 and arrests further travel of the sleeve block and clamp arms secured thereto. During the remainder of the forward movement of the clamp housing 245 the slots 248 and plungers 257 cause the clamp arms 249 to be drawn together, and the shoulder 263 of the latch arm 260 drops behind the lower edge of a slot 264 cut in a hardened steel plate 265 secured to the end closure 247 of the clamp housing, through which slot the latch arm projects. The clamp arms are thereby locked in contracted position until such time as the latch arm is tripped by mechanism presently to be described.

The drawing together of the clamp arms causes them to swing toward a common center, but it will be observed that as each clamp block comes to bear against a pear, the resistance of the fruit against further inward movement of the corresponding clamp arm causes the associated locking plunger 257 to yield, so that further inward movement is prevented. At the same time it will be obvious that the action of the locking plungers prevents separation of the clamps. Thus the several clamp arms are individually urged inwardly only just far enough so that each clamp block firmly engages the pear and no further, and the several clamp arms are individually self-locking after further inward movement is arrested. Thus they are enabled to firmly clasp and hold a pear irrespective of its shape without danger of crushing or mutilating it.

In order to prevent the possibility of the pear squeezing rearwardly out of the clamp blocks 250, a pair of concave guard plates 266 are provided which are mounted a short distance behind the clamp blocks on the forward ends of rods 267 slidably mounted in the end closures of the clamp housing. The rods are interconnected for simultaneous actuation by a U-shaped yoke 268, the ends of which are provided with bearings 269 secured to the rods by set screws 270. Coil springs 271 surround the rods 267 and bear against the yoke bearings 269 so as normally to urge the latter into engagement with the sleeve block 253, which acts as a stop therefor. Adjustment of the rods to vary the position of the clamp blocks 266 is provided for by turning down the rear ends of the rods as at 272 and threading them into sleeves 273 having bolt heads 274, which cooperate with the plate 265 to limit forward movement of the rods. Threaded locking plugs 275 may be screwed into the sleeves 273, thus locking them in position on the rods 267.

In operation, as the separated clamp arms 249 are carried forwardly toward the turret 29 the guards 266 are held in their extreme forward position by the springs 271 until just prior to the end of their forward travel, when the rods 267 are retracted a short distance against the action of the springs 271 by engagement of the yoke 268 with a second stop pin 276 projecting rearwardly from the bridge 224. The length of the stop pin 276 is such that the yoke 268 engages therewith just after the latch arm 260 engages the stop pin 262. As the clamp arms 249 are being drawn together to clamp the pear therebetween, the guard plates 266 are held stationary just behind the butt end of the pear and prevent it from squeezing rearwardly out of the clamp blocks.

As the cam cylinder begins its rearward movement away from the turret the yoke 268 is first carried out of engagement with the stop pin 276, thereby permitting the springs 271 to yieldingly urge the guard plates 266 against the pear held between the clamps, the amount of forward travel of the guard plates being limited by the sleeve block 253 which is locked in position at this time and against which the yoke is urged. This slight forward movement of the guard plates serves to firmly wedge the pear between the clamp blocks against any possibility of slipping. Throughout the rearward stroke of the cam cylinder the clamp arms 249 are held in contracted position by the latch 260, which remains set during this time so that the pear is firmly carried onto the splitting blade 210 into operative relation with the coring and trimming knives.

When the cam cylinder comes to rest in its retracted position the coring and trimming knives are each given a single revolution by their respective drive shafts 222 and 229, whereby to core and trim the fruit being held in operative relation thereto by the clamp arms. As has been seen above, the operation of the Geneva movement which drives the coring and trimming knives is such that the coring and trimming operations are completed a short interval before the cam cylinder starts on its next forward movement. Simultaneously with the completion of these operations, the latch arm 260 is tripped so as to release the slide block 253 and permit the spring 255 to urge it forwardly to open the clamp arms and release the fruit held thereby. Tripping of the latch arm is accomplished by means of a pawl 277 which projects from a collar 278 secured to the shaft 229. The pawl is positioned for operative engagement with the latch arm immediately prior to the end of each revolution of the shaft 229 so that the latch is tripped just as the coring and trimming operations are completed.

To prevent the shock which would result from too sudden a separation of the clamp arms upon the release of the latch 260, a cam plate 279 is mounted on a spacer block 280 secured to the under side of the sleeve block 253 and projects through a slot 281 in the under side of the clamp housing 246 for cooperation with the cam roller 119 carried by the rotating sleeve 7. The forward edge of the cam plate 279 has a short section 282, which lies parallel with the adjacent section of the cam cylinder slot 117, and a pair of longer angular sections 283 and 284 which recede from said slot.

When the sleeve block 253 is held in retracted position by the latch 260 the extreme forward edge of the cam plate 279 is held just slightly behind the rear edge of the slot 117 in the cam cylinder so that the cam roller 119 can pass in front of it. The position of the cam plate and the timing of the driving mechanism is such that the cam roller 119 comes opposite the cam edge 282 just as the pawl 277 trips the latch 260, so that as the sleeve block 253 is released the engagement of the cam 279 with the cam roller 119 permits the sleeve block to advance only just far enough to cause the shoulder 263 of the latch arm 260 to override the edge of the slot 264. Then, as the cam roller 119 continues to advance, the angular edge 284 of the cam plate permits the spring 255 to advance the sleeve block 253 more or less gradually, whereby the clamp arms are gently opened to release the fruit held by them.

The function of the angular edge 283 of the cam plate 279 is to enable the cam roller 119 to ride onto the cam plate without injury thereto in the event the latch 260 should accidentally be tripped prematurely.

The advance of the sleeve block 253, which serves to open the clamps, also permits the springs 271 to advance the rods 267 which carry the guard plates 266 to the extent permitted by the bolt heads 274. By this short advance of the guard plates, if the pear halves should happen to stick to the splitting blade they are pushed forwardly into engagement with a pair of presser plates 285 pivoted at 286 to the under side of the gear housing 212 of the splitting unit. The presser plates 285 are provided with crank arms 287 and springs 288 and are connected with the gear housing and the crank arms to urge the presser plates normally downwardly. Thus, as the pears are pushed along the splitting blades by the guard plates 266 they engage with the presser plates which push them downwardly so that they drop off the blade. The guard plates 266 are provided with upwardly projecting rearwardly curved ears 289 which serve to lift the pusher plates out of the way as the guard plates move therebeneath during their reciprocative movements.

All of the foregoing operations by which the fruit is cored, trimmed and then released, take place while the cam cylinder 111 remains stationary in its retracted position, since the cam roller 120 is passing through the radial portions of the cam cylinder slot 117 during this time. Thus each fruit is cored, trimmed and released before the clamp assembly is advanced to remove another pear from the next stemming tube, whereupon the cycle of operations of the clamp assembly and coring and trimming knives is repeated as above described.

The ejector mechanism

As the completed pears fall from the splitting blade they are received by a trough 290 which extends under the splitting blade and is supported by a bracket 291 secured to one of the tie rods 4 by a split clamp 292.

An ejector mechanism is provided (see Figures 2, 8, 9, and 28) which is operable simultaneously with the cam cylinder 111 to push the pears through the openings between the spider arms 293 of the turret 29 and into a discharge chute 294 formed in the end standard 2. Said ejector mechanism includes a pusher plate 295 carried by an arm 296 secured to one end of a rack 297 which is slidably mounted in a housing 298, so that reciprocation of the rack advances and retracts the pusher plate longitudinally through the trough 290. The housing 298 is secured to the carriage 116 and end plate 110 carried by the cam cylinder, and a pinion 299 is rotatably journalled within the housing and intermeshes with the rack 297, as well as with a second rack 300 rigidly mounted on one of the tie rods 4.

By the arrangement described, the pusher 295 is advanced and retracted simultaneously with the cam cylinder, but the length of stroke of the pusher is double that of the cam cylinder, as will be apparent. This provides a sufficient length of stroke for the pusher to cause it to traverse the entire length of the chute 290 so as to completely eject the fruit therefrom at each forward stroke, this being necessary to insure that no pieces of fruit will be left in the trough to be caught and crushed by the arms 293 of the turret when the latter begins to rotate.

Operation

In summarizing the operation of the machine as a whole it will be convenient to follow the path of a single pear through the machine from its point of introduction to its discharge therefrom, and in so doing it will be understood, of course, that the pears are fed successively and continuously through the machine, and each successive pear receives the same treatment.

Upon the application of power to the main drive shaft 17 the turret shaft 5 is intermittently rotated one-sixth of a revolution at a time by means of the train of gearing including pinion 18, gear 19, Geneva driver 13 and Geneva gear 12, to carry each stemming tube 30 successively into registration with the transfer station C, then with each peeling unit 156 in turn, then with the splitting, coring and trimming unit, and thereafter back to the loading station, from whence the cycle of movement is continuously repeated during operation of the machine.

The feed mechanism is intermittently operated in unison with the turret 29 through the medium of the turret gear 52, gear 51 and feeder drive shaft 50, whereby at each one-sixth revolution of the turret the feed mechanism is revolved one-third revolution to carry each spindle 72 successively from position A to intermediate position B, then to position C into alignment with a stemming tube 30, and then back to position A for a repetition of the cycle.

During each stationary period of the feeder drive shaft 50 an attendant manually positions the stem end of a pear into the opening provided by the complementary notches 132 of that pair of centering blades 131 at position I, which is directly in line with position A of the spindles 72, at which point the spindle is initially in retracted position.

As the attendant supports the pear in the position described, the shuttle block 85 is reciprocated, first rearwardly so that the spring latch rides over and engages behind the cam roller 84 on the slide block 75 to which the spindle is secured, and then forwardly to advance the spindle into engagement with the blossom end of the pear, the operator manually adjusting the position of the pear by eye so that the spindle engages it centrally of its blossom end. By reason of the yieldable connection between the shuttle block 85 and its actuating arm 94, the spindle 72 is brought to bear against the pear just forcibly enough to provide a support therefor without penetrating to any substantial extent into the pear.

The pear is now fully supported between the spindle 72 and centering blades 131 and the succeeding rotative movement of the spindle and centering blade assembly carries them in unison through one-third revolution to positions B and II respectively, where they again come to rest. It will be understod, of course, that simultaneously the succeeding spindle and corresponding pair of centering blades are brought into positions A and I, respectively, whereupon the operator presents another pear to these in the same manner as before.

During the initial portion of travel of the centering blades from I to II they are urged together to shear through the flesh of the pear and snugly grip the stem between the complementary notches 132, thereby gauging the position of the pear with respect to its stem axis so as to align the stem axis with the spindle 72. Then, as the parts approach positions B and II, the spindle is advanced by means of the cam plate 80, acting on the cam roller 84 carried by the slide block 75 thereby firmly impaling the pear on the spindle in accurately axially aligned relation. This is accomplished just before the parts reach positions B and II, whereupon the stem end of the pear passes under the revolving knife 138 which cuts a predetermined portion off its stem end and leaving the pear entirely supported by the spindle 72.

The next succeeding rotative movement of the spindle and centering blades carries them to positions C and III, respectively, during which time the spindle is further advanced to position the pear closely adjacent the stemming tube 30, which comes into axial alignment with the spindle at this position, and the centering blades are opened wide so as not to obstruct the transfer of the pear.

When the spindle carrying the pear has come to rest in position C, the latch block 150 is actuated by the movement of the carriage 116 to advance and retract the pusher 143 which shoves the pear off the spindle and impales it on the stemming tube on its stem axis.

At the next step the turret is rotated to carry the pear downwardly away from the feeding mechanism and into registration with the first peeling unit, the spindle and centering blades meantime revolving back to positions A and I, during which time the retraction of the spindle over the guide rod 69 effects the ejectment from the spindle of any part of the core left therein.

The cam cylinder 111 and its associated carriage 116 are reciprocated during each rest period of the turret 29, first toward and then away from the turret, by the operation of the intermeshing gears 121 and 122, sleeve 7 and cam roller 120, which travels continuously through the cam slot 117 of the cam cylinder. During the forward movement of the carriage 116 the cam carrier 177 moves in unison therewith under the influence of the springs 181 and the pressure of the cam carrier head 176 against the sleeves 172 on the actuating rods 173 of the peeling yokes 157 holds the yokes in separated position so that the peeling assemblies clear the pears carried by the stemming tubes. As the peeling units reach their extreme forward positions the cam roller 119 coming into engagement with the cam plate 182 on the cam carrier 177 retracts the latter from the carriage 116, thereby yieldingly urging the yokes together under the action of the springs 178, whereby the peeling assemblies are brought into operative relation with the pears on the stemming tubes.

Retraction of the carriage 116 draws the peeling knives 202 over the pears to cut a longitudinal peeling from each side thereof, the stops 183 and 184 acting during this time to prevent the pears from being pulled off the stemming tubes. As the peeling assemblies approach the end of their peeling stroke, and just before they travel far enough to come into engagement with the heads 183, the latter are retracted in unison with the peeling assemblies by reason of the sleeves 193 being pushed into engagement with the collars 187 by the rear face of the carriage 116. The buttons 184 remain in place until just as the peeling assemblies run off the butt ends of the pears, whereupon the rearwardly moving tubes 185 strike the collars 194 and cause the retraction of rods 186 and buttons 184 in unison with the tubes 185, heads 183, and the peeling assemblies throughout the remainder of the rearward stroke of the carriage 116. Near the end of the rearward movement of the carriage 116 the cam roller 119 runs off the cam plate 183, thereby causing the cam carrier 177 to again separate the yokes 157 of the peeling units in readiness for a repetition of the reciprocative movement at the next rest period of the turret.

By the intermittent rotative movements of the turret each pear is successively presented to each of the four peeling units in turn, whereby the peel is completely removed from the fruit except for a small portion left in the depressed portion of the blossom end.

The pears are carried from the last peeling unit to the splitting and coring and trimming station for the final operations. At this stage in the cycle of operations the cam roller 119 is traveling across the edge of the cam plate 279 carried by the sleeve block 253 of the clamp assembly, and as it does so the spring 255 urges the slide block 253 forward in the housing to spread the clamp arms apart. The cam cylinder is thereupon advanced toward the turret carrying the separated clamp arms 249 and the guard plates 266 with it until the stop pin 262 engages the end of the latch arm 260, whereupon the clamp arms are held against further forward movement. The continued advance of the cam cylinder and clamp housing 245 contracts the clamp arms so that the clamp blocks 250 firmly grip the pear on the stemming tube, the yieldable plungers 257 permitting individual self adjustment of the several clamp arms to conform to the shape of the pear and automatically locking them in clamping position. In the meantime the shifting of the housing 245 with respect to the latch arm 260 sets the latter so as to prevent the clamp arms from springing open when the latch arm recedes from the stop pin 262 upon the succeeding rearward movement of the housing.

Any tendency of the pear to squeeze rearwardly out of the clamp blocks 250 is prevented by the guard plates 266 which have been slightly retracted just prior to the end of the forward movement of the housing 245 by engagement of the stop pin 276 with the yoke 268 carried by the guard plate supporting rods 267.

As the clamp assembly now begins to recede from the turret 29 the withdrawal of the yoke 268 from the stop pin 276 permits the springs 271 on the yoke supporting rods 267 to yieldingly urge the guard plates against the butt end of the pear gripped between the clamp blocks to the extent permitted by the sleeve block 253 which limits the movement of the yoke 268, and the guard plates thereby cooperate with the clamp blocks 250 to firmly hold the pear between them without danger of slippage.

In this position the pear is drawn over the splitting blade 210 which splits it into halves, and then into operative position with respect to the coring and trimming knives 213 and 225 where it is brought to rest. The coring and trimming knives are actuated through a single revolution at that time whereby the cores are severed from the halved fruit and the butts trimmed to remove the remaining peeling from the blossom end depression.

The rotation of the shaft 229 which actuates the trimming knife 225 operates the pawl 277 to trip the latch arm 260 to release the sleeve 253 which, however, is prevented from springing forwardly too suddenly under the action of the spring 255 by the cam roller 119 which moves in front of the cam plate 279 just at this time. As the cam roller moves across the angular edge of the cam plate, however, the spring 255 gently urges the sleeve 253 forwardly, thereby opening the clamp arms 249 to release the pear halves. Simultaneously the movement of the sleeve 253 permits the springs 271 to advance the guard plates 266 to the extent permitted by the bolt heads 274 so that the pear halves, if they should stick to the splitting blade, are pushed off by the combined action of the guard plates and the presser plates 285. The core sections of the pear are retained on the fins 218 of the coring knife, to be pushed off by the next pear, and are thus cleanly separated from the fruit halves.

The halved fruit drops from the splitting blade into the trough 290 and is thereupon ejected from the machine by the pusher 295 when the latter is actuated by the rack and pinion 297 and 298 during the next succeeding forward movement of the cam cylinder.

As each stemming tube 30 is carried away from the transfer mechanism into position for receiving another pear from the feeding mechanism, the ejector rod 44 is actuated by the cam track 48 to eject the stem portion of the fruit from the tube.

It may be stated at this time that although the particular embodiment of the invention hereinabove described is primarily designed for operating on pears, its application is not necessarily confined thereto, but may be used either in its entirety or in part, and either with or without modifications, on other fruits as well without departing from the spirit of the invention, and we deem ourselves entitled to all such uses, modifications and/or variations as fall within the spirit and scope of the claims hereto appended

Having now described our invention and in what manner the same may be used, what we claim as new and desire to protect by Letters Patent is:

1. In a fruit preparation machine, the combination of fruit supporting means, means for feeding fruit thereto in predetermined axial relation, peeling means operable for peeling fruit impaled upon the supporting means, a splitting blade, a coring knife operatively associated with the splitting blade, means for transferring fruit from the supporting means onto the splitting blade and into operative relation with said coring knife, means for actuating the coring knife in timed relation to the transfer means, means for operating said supporting means to repeatedly receive fruit from the feeding means and to successively present it to the peeling and transfer means, and means for actuating the feeding, peeling and transfer means in timed relation with the operation of the supporting means.

2. In a fruit preparation machine the combination of fruit supporting means comprising a stemming tube, means for feeding fruit thereto in predetermined axial relation, peeling means operable for peeling fruit impaled upon said stemming tube, a splitting blade, a coring knife operatively associated with said splitting blade, means for transferring fruit from said stemming tube onto said splitting blade and into operative relation with said coring knife, means for actuating said coring knife in timed relation to said transfer means, means for operating said stemming tube to repeatedly receive fruit from said feeding means and to successively present it to said peeling and transfer means, and means for actuating the said peeling and transfer means in timed relation with the operation of the supporting means.

3. In a fruit preparation machine the combination of fruit supporting means comprising a stemming tube, means for feeding fruit thereto in predetermined axial relation including an impaling spindle, peeling means operable for peeling fruit impaled upon said stemming tube, a splitting blade, means for transferring fruit from said stemming tube onto said splitting blade, means for operating said stemming tube to repeatedly receive fruit from said feeding means and to successively present it to said peeling and transfer means, and means for actuating the said peeling and transfer means in timed relation with the operation of the supporting means.

4. In a feeding device for pear preparation machines, a fruit impaling means, a pair of centering blades cooperable to clamp the stem portion of a pear therebetween, and arranged in opposed spaced relation to the receiving end of said impaling means, actuating means for alternately opening said centering blades and closing them into direct clamping engagement with the stem portion of the fruit, and means for causing a relative movement between the impaling means and centering blades to impale the fruit onto the impaling means after the centering blades have closed.

5. In a feeding device for pear preparation machines, a fruit impaling means, a pair of centering blades arranged in opposed relation to the impaling means and between which the stem end of a pear may be positioned, means for actuating the centering blades to cut through the flesh of a pear to directly clamp its stem portion therebetween, means for causing a relative movement between the impaling means and the centering blades for positioning the fruit onto the said impaling means, and means thereafter operable for separating the blades to release the pear.

6. In a fruit centering device for a pear preparation machine, a set of centering blades having means engageable with the stem of a pear, and means for actuating said blades to bring said stem engaging means into direct engagement with the stem of said pear to center said pear stem therein.

7. In a fruit centering device for a pear preparation machine, a set of centering blades having means engageable with the stem of a pear, and means for actuating said blades to bring said stem engaging means into position to receive the neck end of a pear and thereafter to actuate said blades to cut through the flesh of the pear until the stem thereof is directly engaged in said stem engaging means.

8. A feeding device for pear preparation machines including a pair of coaxially arranged opposed rotary carriers, a fruit impaling spindle mounted in one of said carriers, a pair of fruit centering blades mounted on the other carrier opposite to said spindle, means for rotating said carriers in unison, means for alternately opening and closing said centering blades as they move with their carrier, means for axially reciprocating said spindle toward and away from said centering blades in timed relation thereto, means for pushing impaled fruit off said spindle, and means for actuating said pushing means during an open period of said blades to eject the fruit therebetween.

9. A feeding device for pear preparation machines including a pair of centering blades mounted for shearing relation and provided with complementary notches cooperable as the blades are closed together to form a centering aperture of varying size for the reception of the stem end of a pear, a fruit impaling spindle mounted for axial alignment with said aperture, means for alternately opening and closing said centering blades, and means for axially reciprocating said spindle toward and away from the centering blades.

10. In a fruit centering and impaling device for a pear preparation machine, a pair of centering blades having complementary notches, fruit impaling means mounted in axial alignment with the converging point of said notches, means for actuating the centering blades to bring the notches thereof into engagement with fruit placed therebetween and thereafter to cause said notches to shear through the fruit into centering engagement with the stem portion thereof, and actuating means operable for causing a relative axial reciprocatory movement between the impaling means and centering blades for positioning the fruit onto the impaling means while the stem portion thereof is maintained centered by said notches.

11. In a fruit centering device for a pear preparation machine, a pair of centering blades having complementary notches, and means for actuating the centering blades to bring the notches thereof into position to receive the neck end of a pear and thereafter to actuate said blades to cause the notches thereof to cut through the meat of the pear until the stem portion thereof is centered between the said notches.

12. In a fruit centering and impaling device for a pear preparation machine, a pair of centering blades having complementary notches, fruit impaling means mounted in axial alignment with the converging point of said notches, means for actuating the centering blades to bring the notches thereof into engagement with fruit placed therebetween and thereafter to cause said notches to shear through the fruit into centering engagement with the stem portion thereof, actuating means operable for causing a relative axial reciprocatory movement between the impaling means and centering blades for positioning the fruit onto the impaling means while the stem portion thereof is maintained centered by said notches, and said actuating means for the centering blades being operable after the impaling operation to actuate the blades to their open position.

13. In a feeding device for pear preparation machines, a pair of centering blades mounted for shearing relation and provided with complementary notches cooperable to form a centering aperture into which the stem end of a pear may be inserted, an impaling spindle mounted for axial alignment with said aperture, means for successively closing said blades together to contract said aperture whereby the notches shear through the flesh of the pear and grip the stem thereof, and thereafter separate the blades to release the pear, means for yieldingly advancing said spindle to impale a pear when said blades are positioned to engage the exterior surface of the pear, and means for further advancing the spindle when said blades contract to embrace the stem of the pear.

14. In a fruit preparation machine, having fruit supporting means, means for delivering fruit to said supporting means including a fruit impaling spindle providing the entire support for fruit impaled thereon, means for centering fruit relative to said spindle, means for actuating said spindle into impaling engagement with fruit positioned in said centering means, and means for transferring fruit from the spindle to said supporting means.

15. In a fruit preparation machine having a carrier provided with fruit supporting means, means for delivering fruit to said supporting means including a fruit impaling spindle, a carrier for said spindle, means for centering fruit relative to said spindle, means for actuating said spindle to impale fruit positioned in said centering means, means for operating said carriers to move said spindle and fruit supporting means into and out of registration with each other, and mean for transferring fruit from the spindle to said supporting means while in registration.

16. In a fruit preparation machine having a rotary carrier provided with fruit supporting means, means for delivering fruit to said supporting means including a fruit impaling spindle, a fruit centering device arranged in opposed relation to said spindle, coaxially arranged opposed rotary carriers for moving said spindle and centering device in unison, means for actuating said spindle to impale fruit positioned in said centering device, means for operating said carriers to move said spindle and fruit supporting means into and out of registration with each other, means for transferring fruit from the spindle to said supporting means, and means for removing said centering device from the path of the fruit during the transfer operation.

17. In a fruit preparation machine having a rotary carrier provided with fruit holding means, means for delivering fruit to said holding means including a fruit impaling spindle, a rotary carrier for said spindle, means for centering fruit relative to said spindle for impalement thereon, means for operating said carriers to bring said spindle and fruit holding means into registration periodically, and means for transferring impaled fruit from said spindle to said fruit holding means when the latter are in registration.

18. In a fruit preparation machine having a rotary carrier provided with fruit supporting means, means for delivering fruit to said supporting means including a fruit impaling spindle, a pair of centering blades arranged in opposed relation to said spindle, rotary carriers for moving said spindle and centering device in unison, means for successively urging said centering blades together to shear through the flesh of a pear and clamp its stem therebetween, and thereafter separate the blades to release the pear, means for actuating said spindle to impale a pear engaged between said centering blades, and means for transferring fruit from said spindle to said supporting means when said centering blades are separated.

19. In a pear preparation machine pear supporting means comprising a stemming tube, means for feeding pears onto said tube with their stem axes centered with respect to the axis of the tube, comprising stem engaging means, an impaling spindle for impaling pears centered by said stem engaging means, and means for transferring fruit from said spindle to said stemming tube, peeling means operable for peeling pears impaled on said stemming tube, and means for operating said stemming tube to repeatedly receive fruit from said feeding means and transfer it into operative relation with said peeling means.

20. In a pear preparation machine, pear supporting means comprising a stemming tube, means for feeding pears onto said tube with their stem axes centered with respect to the axis of the tube, comprising a set of centering members for engaging the stem of a pear, an impaling spindle for impaling a pear with its stem engaged with said centering members, and means for transferring fruit from said spindle to said stemming tube, peeling means operable for peeling pears impaled on said stemming tube, and means for operating said stemming tube to repeatedly receive fruit from said feeding means and transfer it into operative relation with said peeling means.

21. In a pear preparation machine, the combination with a rotatable carrier having a plurality of hollow tubes mounted thereon for supporting and carrying pears with one end of each pear projecting beyond the tube on which it is supported, and means for rotating said carrier, of a cutting element positioned to sever the projecting end of each pear as said carrier is rotated to move said tubes successively past said cutting element.

22. In a pear preparation machine; a fruit supporting stemming tube, means including a hollow impaling spindle for feeding fruit to said stemming tube with the stem end of the fruit presented to said tube and with the fruit stem aligned with the axis of said tube, means for ejecting severed fruit portions from said spindle, means for removing fruit from said stemming tube, and ejecting mechanism associated with said stemming tube for ejecting the severed fruit stem from said tube in a direction opposite the direction of its entry therein.

23. A stemming device for fruit preparation machines including a stemming tube of substantially oval cross section having longitudinally extending fins projecting outwardly from the tube in a plane transverse to the width of the tube and having supporting means at one end only of said tube.

24. A peeling device for fruit peeling machines including peeling means, supporting means therefor, a pivoted mounting in which said supporting means is swivelled, and means yieldably restraining said supporting means from swivelling movement to either side of a predetermined normal position.

25. A peeling device for fruit peeling machines including a pivoted support, a yoke swivelled on said support for swivelling movement about an axis transverse to the pivotal axis of the support, peeling means carried by said yoke, and a spring bearing against said yoke to restrain swivelling movement thereof to either side of a predetermined normal position.

26. A peeling device for fruit peeling machines including peeling means, supporting means therefor, a pivoted mounting in which said supporting means is removably mounted for swivelling movement about an axis transverse to the pivotal axis of the mounting, and a locking device adapted to secure said supporting means to said mounting without interfering with swivelling movement of the supporting means, said locking device being releaseable to permit removal of said supporting means from its mounting.

27. A peeling device for fruit peeling machines including a pivoted support, a yoke, peeling means carried by said yoke, a swivel pin on said yoke removably swivelled in said support, and a releasable locking hook carried by said support and engageable with said yoke axially of said swivel pin to secure the yoke to the support for swivelling movement relative thereto.

28. In a peeling assembly, a pivotally mounted supporting means, a guard roller journaled therein eccentric to the pivotal axis of said supporting means, and an arcuate peeling knife secured to the supporting means adjacent the guard roller, said peeling knife having its cutting edge lying substantially coincident with a plane including the pivotal axis of the supporting means and the rotative axis of the roller and having the apex of its cutting edge located substantially in alignment with the pivotal axis of the supporting means.

29. A peeling assembly for fruit peeling machines including a pivotally mounted supporting means, a peeling knife secured thereto, and a fruit engaging guard secured to said supporting means adjacent said knife and to one side of the pivotal axis of said supporting means whereby a rocking motion is imparted to said supporting means as the guard traverses the surface of fruit being peeled to automatically position the knife to follow the contour of the fruit, the mounting of said knife relative to the pivotal axis of said supporting means being such that the thrust of the fruit thereagainst is substantially in line with said pivotal axis.

30. In a peeling assembly, a pivotally mounted supporting means, a peeling knife secured thereto, and a guard roller journalled in said supporting means adjacent said knife and eccentrically to the pivotal axis of said supporting means whereby a rocking motion is imparted to said supporting means as the roller traverses the surface of fruit being peeled to automatically position the knife to follow the contour of the fruit, the mounting of said peeling knife relative to the pivotal axis of said supporting means being such that the thrust of the fruit thereagainst is substantially in line with said pivotal axis, and said peeling knife having its cutting edge substantially coincident with a plane including the pivotal axis of the supporting means and the rotative axis of the roller.

31. In a peeling assembly, a pivotally mounted supporting means, a guard roller journaled therein eccentric to the pivotal axis of said supporting means, and an arcuate peeling knife secured to the supporting means adjacent the guard roller, said peeling knife having its cutting edge lying substantially coincident with a plane including the pivotal axis of the supporting means and the rotative axis of the roller.

32. In a peeling assembly, a pivotally mounted supporting means, an arcuate peeling knife carried thereby and having the apex of its cutting edge located substantially in alignment with the pivotal axis of said supporting means, and a guard member carried by the supporting means, and having its directing surface to one side of the pivotal axis of said supporting means and positioned to gauge the depth of peel taken by the cutting edge of said knife.

33. In a peeling assembly, a pivotally mounted supporting means, an arcuate peeling knife carried thereby and having the apex of its cutting edge located substantially in alignment with the pivotal axis of said supporting means, a guard member carried by the supporting means and having its directing surface to one side of the pivotal axis of said supporting means and positioned to gauge the depth of peel taken by the cutting edge of said knife, and means operable for yieldingly resisting turning of the supporting means in either direction from its normal position.

34. In a peeling assembly a pivotally mounted supporting means, a single fruit engaging guard member carried by said supporting means to one side of the pivotal axis thereof, and a peeling knife carried by the supporting means adjacent said guard whereby the latter gauges the depth of cut taken by the knife, said peeling knife having a bevelled portion extending rearwardly from its cutting edge on the fruit engaging side only thereof whereby to form a heel for riding engagement with the fruit to tilt the rear portion of the knife clear of the fruit.

35. In a peeling assembly, a pivotally mounted supporting means, a fruit engaging guard member carried by said supporting means to one side of the pivotal axis thereof, and a peeling knife carried by the supporting means adjacent said guard whereby the latter gauges the depth of cut taken by the knife, the mounting of said peeling knife relative to the pivotal axis of said supporting means being such that the thrust of the fruit thereagainst is substantially in line with said pivotal axis, and said peeling knife having a bevelled portion extending rearwardly from its cutting edge on the fruit engaging side thereof whereby to form a heel for riding engagement with the fruit to tilt the rear portion of the knife clear of the fruit.

36. In a peeling assembly, a pivotally mounted supporting means, a single guard member carried thereby and having its directing surface to one side of the pivotal axis thereof, and a peeling knife carried by the supporting means in angular relation to the directing surface of said guard member, said knife being sharpened to a cutting edge by beveling the fruit engaging side only of the blade and the beveled surface thereof lying in a plane which is offset a predetermined perpendicular distance from the directing surface of said guard member.

37. In a peeling assembly, a pivotally mounted supporting means, a guard member carried thereby and having its directing surface to one side of the pivotal axis thereof, and a peeling knife carried by the supporting means in angular relation to the directing surface of the guard member and sharpened to a cutting edge by beveling the fruit engaging side of the knife and said beveled surface lying in a plane which is offset a predetermined perpendicular distance from its related directing surface, said peeling knife having its cutting edge substantially coincident with the pivotal axis of the supporting member.

38. In a peeling assembly, a pivotally mounted supporting means, a guard member carried thereby and having its directing surface to one side of the pivotal axis thereof, and an arcuate peeling knife carried by the supporting means in angular relation to the directing surface of said guard member and sharpened to a cutting edge by beveling the fruit engaging side of the knife and the apex of said beveled surface lying in a plane which is offset a predetermined perpendicular distance from its related directing surface, said peeling knife also having the apex of its cutting edge located substantially co-incident with the pivotal axis of said supporting means.

39. In a peeling assembly, a pivotally mounted supporting means, a guard member carried thereby and having its directing surface to one side of the pivotal axis thereof, an arcuate peeling knife carried by the supporting means in angular relation to the directing surface of said guard member and sharpened to a cutting edge by beveling the fruit engaging side of the knife and having the apex of its cutting edge located substantially coincident with the pivotal axis of said supporting means, and said directing surface having a curvature similar to the curve of the knife and spaced a predetermined perpendicular distance from a plane including the beveled surface of said knife.

40. In a peeling assembly, a pivotally mounted supporting means, a guard member carried thereby and having its directing surface to one side of the pivotal axis thereof, an arcuate peeling knife carried by the supporting means in angular relation to the directing surface of the guard member and sharpened to a cutting edge by beveling the fruit engaging side of the knife and the apex of said beveled surface lying in a plane which is offset a predetermined perpendicular distance from its related directing surface, said peeling knife also having the apex of its cutting edge located substantially co-incident with the pivotal axis of the supporting means, and means for yieldingly resisting turning of the supporting means about its pivotal axis.

41. In a peeling assembly, a pivotally mounted supporting means, a guard roller carried by said supporting means about an axis offset from the pivotal axis of said supporting means, and a peeling knife carried by said supporting means substantially perpendicular to a plane passing through the axes of said guard roller and supporting means.

42. In a peeling device, an oscillatory yoke having a pair of arms, a pair of opposed supporting brackets each pivotally carried by one of the said yoke arms, a relatively flexible peeling blade carried by said brackets, a shaft interconnecting said brackets, and a guard roller journaled upon the shaft, said shaft arranged parallel to but eccentric of the pivotal center of the supporting brackets and forming with the exception of the flexible blade the only means for directly interconnecting said brackets and to thereby reduce the unbalanced weight of the assembly formed of these parts with relation to said pivotal axis to such a point that the oscillatory motion of the yoke will not cause a turning of the assembly about its pivotal axis.

43. In a fruit preparation machine, the combination with fruit supporting means, of a peeling device including a pair of peeling knives, means for reciprocating said peeling device, means for holding said peeling knives in separated relation to clear fruit on said supporting means as the peeling device is moved in one direction, means for yieldingly urging said peeling knives into engagement with the fruit as the peeling device is moved in the other direction whereby said peeling knives are drawn across the surface of the fruit to peel the same, stop means engageable with the fruit to prevent the latter from being removed from the supporting means by the action of the peeling knives during the peeling operation, and means for actuating said stop means into and out of operative relation with the fruit in timed relation to the operation of the peeling device.

44. In a fruit preparation machine, the combination with fruit supporting means of reciprocatory peeling means, means for actuating said peeling means to engage and traverse the surface of fruit supported by said supporting means, stop means engageable with the fruit to prevent the latter from being pulled off the supporting means by the action of the peeling means during the peeling stroke, said stop means including a pair of independently operable fruit engaging members, means for holding one of said fruit engaging members in operative relation with the fruit throughout substantially the entire peeling stroke of said peeling means, and means for holding the other fruit engaging member in operative relation with the fruit during a portion only of said peeling stroke.

45. In a fruit preparation machine, the combination with fruit supporting means, of reciprocatory peeling means, means for actuating said peeling means to engage and traverse the surface of fruit supported by said supporting means, stop means engageable with the fruit to prevent the latter from being pulled off the supporting means by the action of the peeling means during the peeling stroke, said stop means including a pair of concentrically arranged outer and inner stop members, and means for reciprocating said stop means in timed relation to the peeling means to position said outer and inner stop members into operative relation with the fruit during the initial portion of the peeling stroke and to remove said stop members successively in the order named out of the way of the peeling means during the latter part of the peeling stroke.

46. In a fruit preparation machine, the combination with fruit supporting means, of reciprocatory peeling means, means for actuating said peeling means to engage and traverse the surface of fruit supported by said supporting means, stop means engageable with the fruit to prevent the latter from being pulled off the supporting means by the action of the peeling means during the peeling stroke, said stop means including an outer concave fruit engaging head and an inner fruit engaging head adapted to seat concentrically within said outer concave head, means for positioning said fruit engaging heads into operative relation with the fruit during the initial portion of the peeling stroke, means for retracting said outer head out of the way of the peeling means prior to the completion of the peeling stroke, and means for retracting the inner head out of the way of the peeling means substantially as the peeling stroke is completed.

47. In a fruit preparation machine, the combination with fruit supporting means, of a splitting blade, a reciprocatory carriage, means associated with said carriage for transferring fruit from said supporting means onto said splitting blade, peeling means associated with said carriage, means for operating said fruit supporting means to present fruit supported thereby to said peeling and transfer means in succession, and means for actuating said carriage to move the peeling and transfer means into operative relation with fruit presented thereto by said supporting means.

48. In a fruit preparation machine, the combination with a stemming tube for supporting fruit, of a splitting blade, a reciprocatory carriage, means associated with said carriage for transferring fruit from said stemming tube onto said splitting blade, peeling means associated with said carriage, means for operating said stemming tube to present fruit supported thereby to said peeling and said transfer means in succession, and means for actuating said carriage to move the peeling and transfer means into operative relation with fruit presented thereto by said stemming tube.

49. In a fruit preparation machine, the combination with a stemming tube for supporting fruit, and means for ejecting severed fruit stems from said tube, of a splitting blade, a reciprocatory carriage, means associated with said carriage for transferring fruit from said stemming tube onto said splitting blade, peeling means associated with said carriage, means for operating said stemming tube to present fruit supported thereby to said peeling and said transfer means in succession, means for actuating said carriage to move the peeling and transfer means into operative relation with fruit presented thereto by said stemming tube, and means for operating said ejecting means in timed relation to the operation of said stemming tube.

50. In a fruit preparation machine, the combination with fruit supporting means, of a rotary carrier therefor, a splitting blade, a coring knife operatively associated with said splitting blade, reciprocatory clamp means operable back and forth from said fruit supporting means to said splitting blade to grasp and remove fruit from said supporting means and carry it onto the splitting blade into operative relation with said coring knife, and means for actuating said carrier to move said supporting means into and out of registration with said clamp means.

51. In a fruit preparation machine, the combination with fruit supporting means, of a rotary carrier therefor, a splitting blade, a coring knife operatively associated with said splitting blade, means for actuating said coring knife to sever the cores from sections of split fruit on said splitting blade, reciprocatory clamp means operable back and forth from said fruit supporting means to said splitting blade to grasp and remove fruit from said supporting means, carry it onto the splitting blade into operative relation with said coring knife, and then release it after completion of the coring operation, and means for actuating said carrier to move said supporting means into and out of registration with said clamp means.

52. In a fruit preparation machine, a rotary turret provided with fruit supporting means on its forward face, a splitting blade in front of said turret, means including a set of clamps for transferring fruit from said supporting means onto the splitting blade, means for rotating the turret to bring said fruit supporting means into and out of registration with said clamps, means for reciprocating said clamps in timed relation to the operation of the turret, and means for contracting and separating said clasps in time relation to their reciprocative movements to cause them to grasp the fruit on said supporting means carry it onto the splitting blade and thereafter release the split fruit.

53. In a fruit preparation machine, the combination with fruit supporting means, of a splitting blade, a coring knife operatively mounted in said splitting blade, means including a set of clamps for transferring fruit from said supporting means onto the splitting blade into operative relation with said coring knife, means for reciprocating said clamps, means for actuating said coring knife to sever the cores from the sections of split fruit on the splitting blade, and means for contracting and separating said clamps in timed relation to their reciprocative movements to cause them to grasp the fruit on said supporting means, carry it onto the spliting blade into operative relation with the coring knife, hold it in such position during the coring operation, and thereafter release the cored sections of split fruit.

54. In a fruit preparation machine, the combination with fruit supporting means, of reciprocable clamps means operable to grasp fruit on said supporting means and remove it therefrom, and reciprocable means operable in timed relation to said clamp means and cooperable therewith to engage the fruit endwise and firmly hold it against shifting relative to the clamp means.

55. In a fruit preparation machine, the combination with fruit supporting means, of a coring device, reciprocable clamp means operable to grasp fruit on said supporting means and carry it into operative relation with said coring device, and reciprocable means operable in timed relation to said clamp means and cooperable therewith to engage the fruit endwise and firmly hold it against shifting relative to the clamp means during the transfer operation.

56. In a combined splitting and blossom end trimming device for a fruit preparation machine, a fruit splitting blade, a formed rotary trimming knife mounted adjacent the rear edge of said splitting blade, means for moving fruit blossom end foremost on to said splitting blade and into engagement with said trimming knife, and means for rotating said trimming knife to cut out the blossom end of the fruit.

57. In a combined splitting and blossom end trimming device for a fruit preparation machine, a fruit splitting blade, a formed trimming knife mounted adjacent the rear edge of said splitting blade for rotation about an axis in the plane of said blade, means for moving fruit blossom end foremost onto said blade and into operative relation with said trimming knife, and means for rotating the trimming knife to trim the blossom end of the presented fruit.

58. In a fruit preparation machine, a rotary carrier provided with fruit supporting means, a splitting blade, a rotary trimming knife adjacent the rear edge of said blade, transfer means operable to remove fruit from said supporting means and to carry it blossom end foremost onto the blade and into operative relation with said trimming knife, a means for rotating the trimming knife to trim the blossom end of the fruit presented thereto by said transfer means, and means for operating said carrier to move the fruit supporting means into and out of registration with said transfer means.

59. In a rotary carrier provided with a fruit preparation machine, fruit supporting means, a fruit splitting blade, a rotary trimming knife mounted adjacent the rear edge of said blade for rotation about an axis in the plane of said blade, transfer means operable for removing fruit from said supporting means and for carrying said fruit blossom end foremost onto the blade and into operative relation with said trimming knife, means for operating said carrier to move the fruit supporting means into and out of registration with said transfer means, means for actuating the trimming knife to trim the blossom end of fruit presented thereto by said transfer means, and means for actuating the transfer means to release the fruit after completion of the trimming operation.

60. In a fruit preparation machine, the combination with fruit supporting means, of a splitting blade, a coring knife operatively associated with said splitting blade, transfer means operable to remove fruit from said supporting means and carry it onto the splitting blade into operative relation with said coring knife, a trimming knife mounted for engagement with fruit carried into coring position on said splitting blade, and means for actuating said coring and trimming knives to core and trim the fruit presented thereto by said transfer means.

61. In a fruit preparation machine, the combination with fruit supporting means, of a splitting blade, a coring knife operatively associated with said splitting blade, transfer means operable to remove fruit from said supporting means and carry it onto the spliting blade into operative relation with said coring knife, a trimming knife mounted for engagement with fruit carried into coring position on said splitting blade, means for actuating said coring and trimming knives to core and trim the fruit presented thereto by said transfer means, and means for actuating the transfer means to release the fruit after completion of the coring an trimming operations.

62. In a fruit preparation machine, the combination with fruit supporting means, of a splitting blade, a coring knife operatively associated with said splitting blade, means including a plurality of clamps for transferring fruit from said supporting means onto the splitting blade into operative relation with said coring knife, means for reciprocating said clamps, a trimming knife mounted for engagement with fruit carried into coring position on said splitting blade, means for actuating said coring and trimming knives to core and trim the fruit presented thereto by said transfer means, and means for contracting and separating said clamps in timed relation to their reciprocative movements to cause them to grasp the fruit on said supporting means, carry it onto the splitting blade into operative relation with the coring and trimming knives, hold it in such position during the coring and trimming operations, and thereafter release the cored and trimmed sections of split fruit.

63. In a fruit preparation machine, a rotary carrier, a plurality of fruit supporting means thereon, a splitting blade, means for transferring fruit from said supporting means onto said splitting blade, a coring knife operatively associated with said splitting blade to sever the cores from the sections of split fruit on said splitter blade, means for operating said coring knife, means for intermittently driving said carrier to present said fruit supporting means successively to said transfer means, and means for actuating said transfer means in timed relation to said carrier to remove fruit from said supporting means as it is presented thereto, carry it onto the splitting blade into operative relation with said coring knife, hold it during the coring operation, and thereafter release it.

64. In a fruit preparation machine, a rotary carrier, a plurality of fruit supporting means thereon, a splitting blade, means including a plurality of clamps for transferring fruit from said supporting means onto said splitting blade, a coring knife operatively associated with said splitting blade to sever the cores from the sections of split fruit on said splitter blade, means for operating said coring knife, means for intermittently driving said carrier to present said fruit supporting means successively to said transfer means, means for reciprocating said clamps in timed relation to the carrier, and means for contracting and separating said clamps in timed relation to their reciprocative movements to cause them to grasp the fruit presented thereto by said supporting means, carry it onto the splitting blade into operative relation with said coring knife, hold it during the coring operation, and thereafter release it.

65. In a fruit preparation machine, a carrier, a plurality of fruit supporting means thereon, a splitting blade, means for transferring fruit from said supporting means onto said splitting blade, a rotary trimming knife operatively associated with said splitting blade for trimming the blossom ends of fruit transferred on to the splitting blade, means for intermittently driving said carrier to present said fruit supporting means successively to said transfer means, means for actuating said transfer means in timed relation to said carrier for removing fruit from said supporting means as it is presented thereto, carry it onto the spliting blade into operative relation with said trimming knife, hold it during the trimming operation, and thereafter release it, and means for actuating the trimming knife to trim the fruit presented thereto by said transfer means.

66. A splitting, coring and trimming mechanism for fruit preparation machines, including an apertured splitting blade, an arcuate coring knife rotatably mounted in the aperture of said blade, a trimming knife mounted for engagement with fruit positioned in coring relation on said splitting blade, said coring and trimming knives being mounted in fixed relation to said splitting blade, and means for actuating said coring and trimming knives to core and trim fruit passed onto the splitting blade into operative relation therewith.

67. In a fruit preparation machine, a rotary carrier, a plurality of fruit supporting means thereon, peeling means mounted adjacent said carrier, a splitting blade, a coring knife operatively associated with said splitting blade to sever the cores from the sections of split fruit on the splitting blade, means for actuating said coring knife, means for transferring fruit from said supporting means onto said splitting blade, means for intermittently driving said carrier to present each of said fruit supporting means to said peeling means and transfer means in succession, and means for actuating said transfer means in timed relation to said carrier to remove fruit from said supporting means as it is presented thereto, carry said fruit onto the splitting blade into operative relation with said coring knife, hold it in such position during the coring operation, and thereafter release it.

68. In a fruit preparation machine, a rotary carrier, fruit supporting means thereon, a splitting blade, a reciprocatory carriage mounted in opposed relation to said carrier, peeling means associated with said carriage, means for reciprocating said carriage to move the peeling means into and out of operative engagement with fruit on said supporting means, transfer means associated with said carriage for reciprocation therewith to remove fruit from said supporting means and carry it onto said splitting blade, and means for driving said carrier to present said supporting means successively to said peeling and transfer means.

69. In a fruit preparation machine, a rotary carrier, fruit supporting means thereon comprising a stemming tube, a splitting blade, a reciprocatory carriage mounted in opposed relation to said carrier, peeling means associated with said carriage, means for reciprocating said carriage to move the peeling means into and out of operative engagement with fruit on said stemming tube, transfer means associated with said carriage for reciprocation therewith to remove fruit from said stemming tube and carry it onto said splitting blade, and means for driving said carrier to present said stemming tube successively to said peeling and transfer means.

70. A fruit coring knife including an arcuate knife blade mounted for rotation about an axis substantially perpendicular to the arc center axis, and impaling arms projecting radially from the axis of the knife blade for impaling the severed fruit core to separate it from the fruit as the latter is removed from the knife.

71. A fruit coring knife including an arcuate knife blade, and means operatively associated with said blade for impaling the severed fruit core to separate it from the fruit as the latter is removed from the knife, including impaling arms extending radially from the axis of the knife blade, and impaling fins carried by said arms.

72. In a fruit preparation machine, a splitting blade an apertured turret mounted for rotation relative to said splitting blade, fruit supporting means carried by said turret, means for transferring fruit from said supporting means onto said splitting blade, means for intermittently driving said turret to present said supporting means repeatedly to said transfer means, and means operable to receive the split fruit from said splitting blade and eject it from the machine through the turret.

73. A peeling device for fruit peeling machines including peeling means, said peeling means comprising an arcuate cutting edge extending transversely of the direction of travel thereof and having its concave side for presentation to the fruit, supporting means for said peeling means, a pivoted mounting in which said supporting means is swivelled about an axis substantially parallel to said direction of travel, and means yieldably restraining said supporting means from swivelling movement to either side of a predetermined normal position to allow limited yet prevent excessive rocking movement of said cutting edge from said predetermined normal position.

74. In a fruit preparation machine having a frame, the combination with fruit supporting means, of a splitting blade mounted on said frame, a coring knife journalled on said frame in position to core fruit on said splitting blade, a trimming knife journalled on said frame in position to trim fruit on said splitting blade, transfer means operable to remove fruit from said supporting means and carry it onto the splitting blade into operative relation with said coring knife and with said trimming knife, and means for actuating said coring and trimming knives to core and trim fruit carried onto said blade by said transfer means.

75. In a fruit splitting and coring machine, a splitting knife, a coring knife, means for actuating the coring knife to core a pear, and means for supporting and moving the pear onto the splitting knife, this same means holding the pear against movement on the splitting knife during the coring operation.

76. In a fruit splitting and coring machine, a splitting knife, a coring knife, means for supporting and moving a pear onto the splitting knife, means for actuating the coring knife while said first-named means holds the pear on the splitting knife during the coring operation, and means operable independently of the coring knife for cutting off the blossom end while the pear is on the splitting knife.

77. In a fruit splitting and coring machine, a splitting knife, a coring knife, means for actuating the coring knife to core a pear, and means for supporting and moving the pear onto the splitting knife including means for engaging the butt end of the pear to control its position for the coring operation, this same supporting and moving means holding the pear against movement on the splitting knife during the coring operation.

78. In a fruit splitting and coring machine, a splitting knife, a coring knife, means for actuating the coring knife to core a pear, means for supporting and moving the pear onto the splitting knife including means for engaging the butt end of the pear to control its position for the coring operation, this same supporting and moving means holding the pear against movement on the splitting knife during the coring operation, and means mounting said supporting and moving means for linear movement only between a pear receiving position and operative position relative to said splitting knife.

79. In a pear preparation machine, a stemming tube in combination with a traveling carrier, a traveling feeding device for supporting and aligning pears in respect to said stemming tube, said device comprising means for supporting the body of the pear, relatively movable gripping members adjacent to and cooperating with said supporting means and movable therewith for gripping and centering the stem end of a pear with the stem end projecting therefrom, means for moving said supporting and gripping means in a given path, actuating means for said gripping means, said actuating means closing said gripping means after a pear has been fed thereto, a knife positioned in the path of the stem end of a pear so gripped for trimming off the stem end, the said supporting and gripping means aligning said trimmed pears in one position of their path with the stemming tube, said actuating means opening said gripping means when the stem end of the pear has been carried into alignment with the stemming tube, and means for impaling the pear on the stemming tube when aligned therewith.

80. In a fruit centering device or the like, a pair of centering blades mounted in opposed shearing relation and means for actuating said centering blades toward and away from each other, said centering blades having complementary notches formed in their adjacent edges, in one position of the blades to form an opening to receive the stem end of the pear, and in another position to cut through the flesh of said end to form an opening for the stem only, said actuating means to first move said blades into the first position and then move said blades into the second position to closely center the stem.

ALBERT R. THOMPSON.
WILLIAM DE BACK.

CERTIFICATE OF CORRECTION.

Patent No. 2,139,704.  December 13, 1938.

ALBERT R. THOMPSON, ET AL.

It is hereby certified that error appears in the printed specification of the above numbered patent requiring correction as follows: Page 1, first column, line 18, for the word "pairs" read pears; page 3, second column, line 72, for "mounted" second occurrence, read formed; page 6, first column, line 51, for "arm 15" read arm 65; page 13, second column, line 73, before "yokes" first occurrence, insert unit; page 16, first column, line 44, claim 15, for "mean" read means; page 19, second column, line 8, claim 52, for "clasps in time" read clamps in timed; line 74, claim 58, strike out the article "a"; page 20, first column, lines 5 and 6, claim 59, strike out "rotary carrier provided with a fruit preparation machine," and insert instead fruit preparation machine, a rotary carrier provided with; and that the said Letters Patent should be read with this correction therein that the same may conform to the record of the case in the Patent Office.

Signed and sealed this 11th day of April, A. D. 1939.

Henry Van Arsdale (Seal)  Acting Commissioner of Patents.

centering blades toward and away from each other, said centering blades having complementary notches formed in their adjacent edges, in one position of the blades to form an opening to receive the stem end of the pear, and in another position to cut through the flesh of said end to form an opening for the stem only, said actuating means to first move said blades into the first position and then move said blades into the second position to closely center the stem.

ALBERT R. THOMPSON.
WILLIAM DE BACK.

CERTIFICATE OF CORRECTION.

Patent No. 2,139,704. December 13, 1938.

ALBERT R. THOMPSON, ET AL.

It is hereby certified that error appears in the printed specification of the above numbered patent requiring correction as follows: Page 1, first column, line 18, for the word "pairs" read pears; page 3, second column, line 72, for "mounted" second occurrence, read formed; page 6, first column, line 51, for "arm 15" read arm 65; page 13, second column, line 73, before "yokes" first occurrence, insert unit; page 16, first column, line 44, claim 15, for "mean" read means; page 19, second column, line 8, claim 52, for "clasps in time" read clamps in timed; line 74, claim 58, strike out the article "a"; page 20, first column, lines 5 and 6, claim 59, strike out "rotary carrier provided with a fruit preparation machine," and insert instead fruit preparation machine, a rotary carrier provided with; and that the said Letters Patent should be read with this correction therein that the same may conform to the record of the case in the Patent Office.

Signed and sealed this 11th day of April, A. D. 1939.

Henry Van Arsdale (Seal)

Acting Commissioner of Patents.